US008680174B2

(12) United States Patent
Hiraishi et al.

(10) Patent No.: US 8,680,174 B2
(45) Date of Patent: Mar. 25, 2014

(54) WATER-BASED INK FOR INK-JET PRINTING

(75) Inventors: Atsushi Hiraishi, Wakayama (JP); Kyoichi Shirota, Wakayama (JP); Yuki Wakabayashi, Wakayama (JP); Yasuhiro Doi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/140,235

(22) PCT Filed: Dec. 11, 2009

(86) PCT No.: PCT/JP2009/071078
§ 371 (c)(1),
(2), (4) Date: Sep. 1, 2011

(87) PCT Pub. No.: WO2010/071185
PCT Pub. Date: Jun. 24, 2010

(65) Prior Publication Data
US 2011/0306708 A1 Dec. 15, 2011

(30) Foreign Application Priority Data

| Dec. 16, 2008 | (JP) | 2008-319585 |
| Dec. 16, 2008 | (JP) | 2008-319590 |
| Feb. 10, 2009 | (JP) | 2009-028972 |

(51) Int. Cl.
C09D 11/00 (2006.01)
C08K 9/00 (2006.01)

(52) U.S. Cl.
USPC .......................................... 523/160; 523/200

(58) Field of Classification Search
USPC ................................. 523/160, 200
See application file for complete search history.

(56) References Cited

U.S. PATENT DOCUMENTS

| 5,454,864 | A | * | 10/1995 | Whalen-Shaw | 106/416 |
| 5,554,215 | A | * | 9/1996 | Simpson et al. | 106/436 |
| 6,129,786 | A | | 10/2000 | Camara et al. | |
| 6,297,296 | B1 | * | 10/2001 | Wexler | 523/160 |
| 6,536,890 | B1 | * | 3/2003 | Kato et al. | 347/100 |
| 2002/0077385 | A1 | | 6/2002 | Miyabayashi | |
| 2004/0173120 | A1 | | 9/2004 | Tsuru et al. | |
| 2004/0176530 | A1 | | 9/2004 | Tielemans et al. | |
| 2010/0010148 | A1 | | 1/2010 | Imai et al. | |

FOREIGN PATENT DOCUMENTS

| CN | 1527865 A | 9/2004 |
| JP | 2005-036039 A | 2/2005 |
| JP | 2008-081545 A | 4/2008 |
| JP | 2008-239961 A | 10/2008 |

OTHER PUBLICATIONS

International Search Report (PCT/ISA/210; PCT/ISA/220) dated Jun. 8, 2010 for PCT/JP2009/071078.
Written Opinion Opinion of ISA (PCT/ISA/237), dated Jun. 8, 2010 for PCT/JP2009/071078.
Japanese Office Action for Japanese Application No. 2008-319585 dated May 7, 2013.
Japanese Office Action for Japanese Application No. 2008-319590 dated May 7, 2013.
Office Action for corresponding Chinese Patent Application No. 200980153791.9, dated Feb. 21, 2013.

* cited by examiner

*Primary Examiner* — Alexander Kollias
(74) *Attorney, Agent, or Firm* — Birch, Stewart, Kolasch & Birch, LLP

(57) ABSTRACT

The present invention is directed to a water dispersion for ink-jet printing which realizes sufficient optical density and exhibits excellent filterability and storage stability; a water-based ink containing the water dispersion; and a process for producing the water dispersion or the water-based ink. The invention includes the following: (1) a water dispersion for ink-jet printing containing anionic colorant particles and cationic polymer particles, and a water-based ink for ink-jet printing containing the water dispersion; (2) a process for producing a water dispersion for ink-jet printing including a step of mixing a water dispersion of anionic colorant particles with a water dispersion of cationic polymer particles, to thereby produce a water dispersion of composite particles formed of the cationic polymer particles and the anionic colorant particles adhering thereto, and a water dispersion produced through the production process; and (3) a process for producing a water-based ink for ink-jet printing including step (A) of mixing a water dispersion of cationic polymer particles with a water-soluble organic solvent, or dispersing a cationic polymer in water and a water-soluble organic solvent, to thereby produce a dispersion containing the cationic polymer particles, water, and the water-soluble organic solvent; and step (B) of mixing the produced dispersion with a dispersion containing anionic colorant particles and water.

1 Claim, 1 Drawing Sheet

WATER-BASED INK FOR INK-JET PRINTING

FIELD OF THE INVENTION

The present invention relates to a water dispersion for ink-jet printing; to a water-based ink for ink-jet printing; and to a process for producing the water dispersion or the water-based ink.

BACKGROUND OF THE INVENTION

Ink-jet printing is a technique in which ink droplets are ejected through very fine nozzles toward a recording medium and deposited directly onto the recording medium, to thereby provide the medium with characters or images. This technique is very prevalent, since it has various advantages, in that full-color printing is readily and inexpensively achieved, plain paper can be used as a recording medium, and a printing head does not come into contact with an object to be printed.

Recently, an ink containing a pigment serving as a coloring material has been widely used for imparting weatherability or water resistance to a printed object. In order to prevent bleeding of the ink or to improve fixation of the pigment onto a paper sheet, a resin emulsion or the like is added to the ink.

Patent Document 1 discloses an aqueous pigment dispersion containing a pigment, a hydrophobic-group-containing cationic polymer, and a hydrophobic-group-containing anionic polymer, which dispersion is provided for improvement in, for example, dispersion stability.

Patent Document 2 discloses an ink for ink-jet printing containing a cationic surface-modified self-dispersible pigment, anionic resin particles exhibiting a zeta potential of −15 mV or less at a pH of 6, and an aqueous medium, which ink is provided for improvement in, for example, optical density.

Patent Document 3 discloses an ink containing a first pigment (i.e., an anionic or cationic self-dispersible pigment), a second pigment (i.e., a pigment which can be dispersed in an aqueous medium by a polymer dispersant), a polymer dispersant having the same polarity as the first pigment, and a nonionic polymer dispersant, which ink is provided for improvement in, for example, image density.

Patent Document 4 discloses a method for forming an ink-jet ink composition, the method including a step of combining an emulsion of an emulsifiable polymer resin in an anionic medium with a pigment and a cationic surfactant, and aggregating particles in the resultant mixture to a desired particle size.

Patent Document 5 discloses a colorant for an ink-jet ink, the colorant containing composite powder particles formed of extender particles whose surfaces are coated with a paste on which an organic pigment layer is uniformly deposited.

Patent Document 6 discloses (1) a dispersible coloring material for ink-jet printing containing a coloring material, and chargeable resin pseudo fine particles having a size smaller than that of the coloring material, the particles being fixed or fused onto the coloring material, wherein the coloring material itself has a surface charge; and (2) a process for producing a dispersible coloring material, wherein radically polymerizable monomers are subjected to aqueous precipitation polymerization in an aqueous dispersion solution in which a water-insoluble coloring material having a polar group bonded to its surface is dispersed, to thereby form chargeable resin pseudo fine particles fixed or melt-adhered to the surface of the water-insoluble coloring material.

Patent Document 1: Japanese Patent Application Laid-Open (kokai) No. 2008-239961
Patent Document 2: Japanese Patent Application Laid-Open (kokai) No. 2003-306624
Patent Document 3: Japanese Patent Application Laid-Open (kokai) No. 2000-239589
Patent Document 4: Japanese Patent Application Laid-Open (kokai) No. H09-124985
Patent Document 5: Japanese Patent Application Laid-Open (kokai) No. 2003-55591
Patent Document 6: Japanese Patent Application Laid-Open (kokai) No. 2006-37087

SUMMARY OF THE INVENTION

The present invention relates to the following (i) to (iii).

(i) A water dispersion for ink-jet printing containing anionic colorant particles and cationic polymer particles; and a water-based ink for ink-jet printing comprising the water dispersion.

(ii) A process for producing a water dispersion for ink-jet printing containing a step of mixing a water dispersion of anionic colorant particles with a water dispersion of cationic polymer particles, to thereby produce a water dispersion of composite particles formed of the cationic polymer particles and the anionic colorant particles adhering thereto; and a water-based ink for ink-jet printing comprising a water dispersion produced through the process.

(iii) A process for producing a water-based ink for ink-jet printing containing the following steps (A) and (B):

step (A): a step of mixing a water dispersion of cationic polymer particles with a water-soluble organic solvent, or dispersing the cationic polymer in water and the water-soluble organic solvent, to thereby produce a dispersion containing the cationic polymer particles, water, and the water-soluble organic solvent; and step (B): a step of mixing the dispersion produced in step (A) with a dispersion containing anionic colorant particles and water.

DETAILED DESCRIPTION OF THE INVENTION

Figure 1:
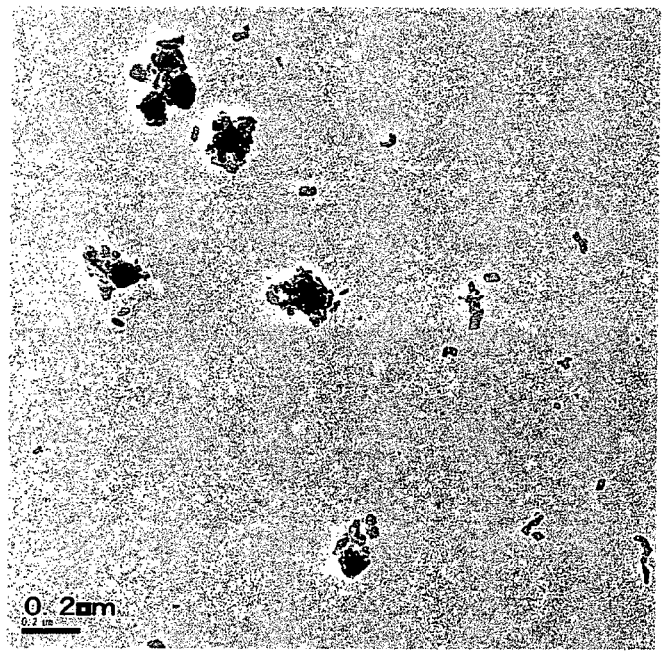
FIG. 1 shows an electron microscopic photoimage of composite particles produced in Production Example II-1.

Conventional inks containing a water-insoluble dispersible coloring material (e.g., a pigment) pose a problem in that sufficient optical density is difficult to attain.

The present invention relates to a water dispersion for ink-jet printing which realizes sufficient optical density and exhibits excellent filterability and storage stability; a water-based ink containing the water dispersion; and a process for producing the water dispersion or the water-based ink.

The present inventors have conducted studies on the basis of the assumption that difficulty in attaining sufficient optical density by use of an ink containing a water-insoluble dispersible coloring material (e.g., a pigment) is attributed to easy permeation of the coloring material—which is in the form of fine particles—into a paper sheet. As a result, the present inventors have found that optical density can be improved by using a water dispersion containing anionic colorant particles and cationic polymer particles, and that when a water-soluble organic solvent is employed for the production of an ink from the water dispersion, the ink exhibits improved filterability.

Accordingly, the present invention is directed specifically to the following (1) to (5).

(1) A water dispersion for ink-jet printing containing anionic colorant particles and cationic polymer particles.

(2) A water-based ink for ink-jet printing containing the water dispersion described in (1) above.

(3) A process for producing a water dispersion for ink-jet printing comprising the following step (a):

step (a): a step of mixing a water dispersion of anionic colorant particles with a water dispersion of cationic polymer particles, to thereby produce a water dispersion of composite particles formed of the cationic polymer particles and the anionic colorant particles adhering thereto.

(4) A water-based ink for ink-jet printing containing a water dispersion produced through the production process described in (3) above.

(5) A process for producing a water-based ink for ink-jet printing comprising the following step (A-1) or (A-2), and step (B):

step (A-1): a step of mixing a water dispersion of cationic polymer particles with a water-soluble organic solvent, to thereby produce a dispersion containing the cationic polymer particles, water, and the water-soluble organic solvent; or step (A-2): a step of dispersing a cationic polymer in water and a water-soluble organic solvent, to thereby produce a dispersion containing the cationic polymer particles, water, and the water-soluble organic solvent; and step (B): a step of mixing the dispersion produced in step (A-1) or (A-2) and containing the cationic polymer particles, water, and the water-soluble organic solvent with a dispersion containing anionic colorant particles and water.

A characteristic feature of the water dispersion or water-based ink for ink-jet printing of the present invention resides in that it contains anionic colorant particles and cationic polymer particles. The water dispersion or the water-based ink preferably contains composite particles formed of cationic polymer particles and anionic colorant particles adhering thereto (hereinafter the composite particles may be referred to simply as "composite particles"), from the viewpoints of optical density and storage stability. Adhesion of anionic colorant particles to cationic polymer particles can be confirmed through observation of the water dispersion or the water-based ink under an electron microscope.

As used herein, "adhesion of anionic colorant particles to cationic polymer particles" refers to both cases where anionic colorant particles adhere onto the surfaces of cationic polymer particles, and the case where some anionic colorant particles enter into the structure of cationic polymer particles. From the viewpoint of improvement in optical density, preferably, anionic colorant particles adhere onto the surfaces of cationic polymer particles.

The reason why the water dispersion or water-based ink for ink-jet printing of the present invention provides a printed image with high optical density has not yet been fully elucidated. However, one conceivable reason is that composite particles formed of cationic polymer particles and anionic colorant (pigment) particles adhering thereto have surface irregularities, regardless of, for example, the composite particle concentration of the ink or the pH of the ink, and thus the composite particles are likely to remain on the printing surface of, for example, a paper sheet, leading to further improvement in the optical density of a printed image.

Generally, a water-based ink-jet ink is designed to exhibit weak alkalinity for preventing corrosion of an ink flow passage or parts of a head. Similarly, the water dispersion or water-based ink for ink-jet printing of the present invention preferably has a pH of 7 to 10, more preferably 7 to 9.

The present invention employs anionic colorant particles, from the viewpoint of reliably dispersing, in such a weakly alkaline liquid, colorant particles in an amount required for attaining sufficient optical density. Also, the present invention employs cationic polymer particles, from the viewpoints of effective interaction of the polymer particles with anionic colorant particles, and improvement in optical density. Preferably, the present invention employs composite particles formed of cationic polymer particles and anionic colorant particles effectively adhering thereto, from the viewpoint of improvement in optical density.

Next will be described components employed in the water dispersion or water-based ink for ink-jet printing of the present invention, and steps of the production process of the present invention.

[Anionic Colorant Particles]

The anionic colorant particles employed in the present invention are preferably colorant-containing anionic polymer particles, from the viewpoints of dispersion stability of the colorant particles in the water dispersion or the water-based ink, and improvement in optical density of a printed image provided by the water dispersion or the water-based ink. The anionic polymer particles are preferably anionic cross-linked polymer particles, from the viewpoint of storage stability of the anionic polymer particles. As described hereinbelow, the cross-linked polymer particles may be produced in the form of, for example, a water dispersion of colorant-containing anionic cross-linked polymer particles, by means of adding a cross-linking agent to a water dispersion of colorant-containing anionic polymer particles.

As used herein, the term "anionic" refers to the case where, when an unneutralized compound or the like is dispersed or dissolved in pure water, the resultant dispersion or solution exhibits a pH of less than 7; or the case where, when an unneutralized compound or the like is insoluble in pure water, and the pH of the product of the compound or the like dispersed in pure water cannot be specifically determined, the pure water dispersion product exhibits a negative zeta potential.

Examples of the anionic colorant particles include particles formed only of a colorant (e.g., a pigment); particles formed through dispersion of a colorant with an anionic surfactant; particles formed through dispersion of a colorant with an anionic polymer dispersant; and colorant-containing anionic polymer particles. Preferably, colorant-containing anionic polymer particles are employed.

The anionic colorant particles preferably have an average particle size of 30 to 300 nm, more preferably 40 to 200 nm, still more preferably 50 to 150 nm, much more preferably 60 to 90 nm, from the viewpoint of optical density of a printed image provided by the water-based ink.

From the viewpoint of forming composite particles by effectively causing the anionic colorant particles to adhere to cationic polymer particles, preferably, the anionic colorant particles have an average particle size smaller than that of the cationic polymer particles. Average particle size can be determined through the method described in the Examples hereinbelow.

(Colorant)

No particular limitation is imposed on the colorant employed in the present invention, and the colorant may be, for example, a pigment, a hydrophobic dye, or a water-soluble dye (e.g., acid dye, reactive dye, or direct dye). However, the colorant is preferably a pigment or a hydrophobic dye, more preferably a pigment, from the viewpoint of optical density.

When a pigment or a hydrophobic dye is employed in the water dispersion or the water-based ink, preferably, the pigment or the hydrophobic dye is formed, by use of a surfactant or a polymer, into fine particles stable in the water dispersion or the water-based ink. Particularly preferably, the pigment and/or the hydrophobic dye is incorporated into polymer particles, from the viewpoint of, for example, bleeding resistance or water resistance.

The pigment may be an inorganic pigment or an organic pigment. Such a pigment may optionally be employed in combination with an extender.

Examples of the inorganic pigment include carbon black, metal oxides, metal sulfides, and metal chlorides. In the case of a black water-based ink, carbon black is preferably employed. Examples of the carbon black include furnace black, thermal lamp black, acetylene black, and channel black.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

No particular limitation is imposed on the hue of the organic pigment employed, and the organic pigment may be a chromatic pigment such as a red organic pigment, a yellow organic pigment, a blue organic pigment, an orange organic pigment, or a green organic pigment.

Specific examples of preferred organic pigments include one or more products with part numbers selected from the group consisting of C.I. Pigment Yellow, C.I. Pigment Red, C.I. Pigment Violet, C.I. Pigment Blue, C.I. Pigment Orange, and C.I. Pigment Green. The organic pigment employed may be a solid solution pigment such as a quinacridone solid solution pigment.

The quinacridone solid solution pigment is formed of non-substituted quinacridone (e.g., β-quinacridone or γ-quinacridone) and dichloroquinacridone (e.g., 2,9-dichloroquinacridone, 3,10-dichloroquinacridone, or 4,11-dichloroquinacridone). The quinacridone solid solution pigment is preferably a solid solution pigment formed of a combination of non-substituted quinacridone (C.I. Pigment Violet 19) and 2,9-dichloroquinacridone (C.I. Pigment Red 202).

The present invention may also employ a self-dispersible pigment. As used herein, "self-dispersible pigment" refers to an inorganic or organic pigment which has one or more hydrophilic functional groups (e.g., an anionic hydrophilic group such as a carboxy group or a sulfonate group, or a cationic hydrophilic group such as a quaternary ammonium group) that are bonded, directly or via an additional atomic group, to the surface of the pigment, and which can be dispersed in an aqueous medium without use of a surfactant or a resin. Examples of the additional atomic group include a C1 to C12 alkanediyl group, a phenylene group, and a naphthylene group. The hydrophilic functional group is preferably an anionic hydrophilic group such as a carboxy group or a sulfonate group.

When a pigment is transformed into a self-dispersible pigment, for example, a required amount of a hydrophilic functional group is chemically bonded to the surface of the pigment through a customary method. More specifically, preferred is a liquid-phase oxidation method employing, for example, an acid (e.g., nitric acid, sulfuric acid, peroxodisulfuric acid, hypochlorous acid, or chromic acid), or a method of bonding a hydrophilic group by use of a coupling agent.

No particular limitation is imposed on the amount of the hydrophilic functional group, but the amount is preferably 100 to 3,000 μmol on the basis of 1 g of the self-dispersible pigment. When the hydrophilic functional group is a carboxy group, the amount thereof is preferably 200 to 700 μmol on the basis of 1 g of the self-dispersible pigment.

Examples of commercially available products of anionic self-dispersible pigments include CAB-O-JET 200, CAB-O-JET 300, CAB-O-JET 1027R, CAB-O-JET 250C, CAB-O-JET 260M, CAB-O-JET 270Y, and CAB-O-JET 554B (products of Cabot Corporation); BONJET CW-1 and BONJET CW-2 (products of Orient Chemical Industries Co., Ltd.); and Aqua-Black 162 (product of Tokai Carbon Co., Ltd.).

No particular limitation is imposed on the type of the hydrophobic dye employed, so long as it can be incorporated into polymer particles. The hydrophobic dye is preferably a dye which dissolves in an amount of 2 g/L or more, preferably, 20 to 500 g/L (25° C.) in an organic solvent (preferably, methyl ethyl ketone) employed upon production of a polymer, from the viewpoint of effective incorporation of the dye into the polymer.

Examples of the hydrophobic dye include an oil-soluble dye and a disperse dye. Of these, an oil-soluble dye is preferred. Examples of the oil-soluble dye include one or more products with part numbers selected from the group consisting of C.I. Solvent Black, C.I. Solvent Yellow, C.I. Solvent Red, C.I. Solvent Violet, C.I. Solvent Blue, C.I. Solvent Green, and C.I. Solvent Orange. These products are commercially available from, for example, Orient Chemical Industries Co., Ltd. and BASF.

The aforementioned colorants may be employed singly, or in combination of two or more species in any proportions.

[Colorant-Containing Anionic Polymer Particles]
(Anionic Polymer)

The anionic polymer employed in colorant-containing anionic polymer particles is preferably a water-insoluble polymer, from the viewpoint of improvement in optical density of a printed image provided by the water dispersion or the water-based ink. As used herein, "water-insoluble polymer" is the same as defined below in the cationic polymer. The amount of the anionic polymer dissolved in water corresponds to that as determined when anionic groups of the polymer are 100% neutralized with sodium hydroxide.

Examples of the polymer which may be employed include polyester, polyurethane, and vinyl polymers. Preferred is a vinyl polymer produced through addition polymerization of a vinyl monomer (vinyl compound, vinylidene compound, or vinylene compound), from the viewpoint of dispersion stability of anionic polymer particles.

The vinyl polymer is preferably a vinyl polymer produced through copolymerization of a mixture containing (a) an anionic monomer (hereinafter may be referred to as "component (a)"), and (b) a macromer (hereinafter may be referred to as "component (b)") and/or (c) a hydrophobic monomer (hereinafter may be referred to as "component (c)") (hereinafter the mixture may be referred to simply as "monomer mixture"). The vinyl polymer includes a structural unit derived from component (a), and a structural unit derived from component (b) and/or a structural unit derived from component (c). Particularly preferably, the vinyl polymer includes all the structural units derived from component (a), component (b), and component (c).

[Anionic Monomer (a)]

The anionic monomer (a) is employed as a monomer component of the anionic polymer for reliably dispersing the anionic colorant particles in the water dispersion or the water-based ink, or for reliably dispersing the composite particles in the water dispersion or the ink, so that the anionic colorant particles effectively adhere to the cationic polymer particles.

Examples of the anionic monomer include a carboxylic acid monomer, a sulfonic acid monomer, and a phosphoric acid monomer.

Examples of the carboxylic acid monomer include acrylic acid, methacrylic acid, crotonic acid, itaconic acid, maleic acid, fumaric acid, citraconic acid, and 2-methacryloyloxymethylsuccinic acid.

Examples of the sulfonic acid monomer include styrenesulfonic acid, 2-acrylamido-2-methylpropanesulfonic acid, 3-sulfopropyl(meth)acrylate, and bis-(3-sulfopropyl)-itaconic acid ester.

Examples of the phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Of the aforementioned anionic monomers, a carboxylic acid monomer is preferred, with acrylic acid or methacrylic acid being more preferred, from the viewpoint of dispersion stability of the anionic colorant particles or the composite particles in the water dispersion or the water-based ink.

[Macromer (b)]

The macromer (b) is a compound having a polymerizable functional group at one terminal end thereof and having a number average molecular weight of 500 to 100,000. The macromer (b) is employed as a monomer component of the anionic polymer, from the viewpoint of dispersion stability of the anionic colorant particles or the composite particles in the water dispersion or the water-based ink. The polymerizable functional group at one terminal end of the macromer is preferably an acryloyloxy group or a methacryloyloxy group, more preferably a methacryloyloxy group. The macromer (b) preferably has a number average molecular weight of 500 to 100,000, more preferably 1,000 to 10,000. The number average molecular weight of the macromer is determined through gel chromatography using, as a solvent, chloroform containing 1 mmol/L dodecyldimethylamine and using polystyrene as a standard substance.

The macromer (b) is preferably a styrenic macromer, an aromatic-group-containing (meth)acrylate macromer, or a silicone macromer, from the viewpoint of dispersion stability of the anionic colorant particles or the composite particles in the water dispersion or the water-based ink.

Examples of the styrenic macromer include a homopolymer of a styrenic monomer, and a copolymer of a styrenic monomer and an additional monomer. When the styrenic macromer is a copolymer, the styrenic monomer content of the copolymer is preferably 50 wt. %, or more, more preferably 70 wt. % or more, from the viewpoint of dispersion stability of the anionic colorant particles or the composite particles in the water dispersion or the water-based ink. Examples of the styrenic monomer include styrene, 2-methylstyrene, vinyltoluene, ethylvinylbenzene, vinylnaphthalene, and chlorostyrene. Examples of the additional monomer copolymerized include aromatic-group-containing (meth) acrylate and acrylonitrile. Specific examples of the styrenic macromer include AS-6(S), AN-6(S), and HS-6(S) (trade name, Toagosei Co., Ltd.).

Examples of the aromatic-group-containing (meth)acrylate macromer include a homopolymer of an aromatic-group-containing (meth)acrylate monomer, and a copolymer of an aromatic-group-containing (meth)acrylate monomer and an additional monomer. When the aromatic-group-containing (meth)acrylate macromer is a copolymer, the aromatic-group-containing (meth)acrylate monomer content of the copolymer is preferably 50 wt. % or more, more preferably 70 wt. % or more, from the viewpoint of dispersion stability of the anionic colorant particles or the composite particles in the water dispersion or the water-based ink.

Examples of the aromatic-group-containing (meth)acrylate include (meth)acrylates having a C7 to C22 arylalkyl group optionally having a heteroatom-containing substituent, and (meth)acrylates having a C6 to C22 aryl group optionally having a heteroatom-containing substituent. Specific examples of the (meth)acrylate monomer include benzyl (meth)acrylate, phenoxyethyl(meth)acrylate, 2-hydroxy-3-phenoxypropyl acrylate, and 2-methacryloyloxyethyl-2-hydroxypropyl phthalate. Preferred is benzyl(meth)acrylate. Examples of the additional monomer copolymerized include a styrenic monomer and acrylonitrile.

The macromer (b) may be a silicone macromer. Examples of the silicone macromer include organopolysiloxanes each having a polymerizable functional group at one terminal end thereof.

[Hydrophobic Monomer (c)]

The hydrophobic monomer (c) is employed as a monomer component of the anionic polymer, from the viewpoint of improvement in optical density of a printed image provided by the water dispersion or the water-based ink. Examples of the hydrophobic monomer include an alkyl(meth)acrylate and an aromatic-group-containing monomer.

The alkyl(meth)acrylate is preferably one having a C1 to C22 alkyl group, preferably, a C6 to C18 alkyl group. Examples of the alkyl(meth)acrylate include methyl(meth)acrylate, ethyl(meth)acrylate, (iso)propyl(meth)acrylate, (iso- or tertiary-)butyl(meth)acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl(meth)acrylate, and (iso)stearyl(meth)acrylate.

As used herein, "(iso- or tertiary-)" or "(iso)" refers to the corresponding iso- or tertiary- or iso group, and also to the corresponding normal group. As used herein, "(meth)acrylate" refers to acrylate and/or methacrylate.

The aromatic-group-containing monomer is preferably a vinyl monomer having a C6 to C22 aromatic group optionally having a heteroatom-containing substituent, more preferably a styrenic monomer or an aromatic-group-containing (meth) acrylate. Preferably, these monomers are employed in combination.

The styrenic monomer is preferably styrene, 2-methylstyrene, or divinylbenzene, more preferably styrene.

The aromatic-group-containing (meth)acrylate is preferably, for example, benzyl(meth)acrylate or phenoxyethyl (meth)acrylate, more preferably benzyl(meth)acrylate.

[Nonionic Monomer (d)]

The monomer mixture may also contain a nonionic monomer (d) (hereinafter may be referred to as "component (d)").

Examples of component (d) include 2-hydroxyethyl(meth) acrylate, 3-hydroxypropyl(meth)acrylate, polyethylene glycol (n=2 to 30, "n" represents the average molar number of addition of oxyalkylene groups (the same shall apply hereinafter)) (meth)acrylate, polypropylene glycol (n=2 to 30) (meth)acrylate, poly(ethylene glycol (n=1 to 15)-propylene glycol (n=1 to 15)) (meth)acrylate, methoxypolyethylene glycol (1 to 30) (meth)acrylate, methoxypolytetramethylene glycol (1 to 30) (meth)acrylate, ethoxypolyethylene glycol (1 to 30) (meth)acrylate, octoxypolyethylene glycol (1 to 30) (meth)acrylate, polyethylene glycol (1 to 30) (meth)acrylate 2-ethylhexyl ether, (iso)propoxypolyethylene glycol (1 to 30) (meth)acrylate, butoxypolyethylene glycol (1 to 30) (meth) acrylate, methoxypolypropylene glycol (1 to 30) (meth)acrylate, and methoxy(ethylene glycol-propylene glycol copolymer) (1 to 30, wherein the number of ethylene glycol units is 1 to 29) (meth)acrylate.

Specific examples of commercially available component (d) include NK Ester M-40G, NK Ester M-90G, and NK Ester M-230G (products of Shin-Nakamura Chemical Co., Ltd.); and Blemmer PE-90, Blemmer PE-200, Blemmer PE-350, Blemmer PME-100, Blemmer PME-200, Blemmer PME-400, Blemmer PME-1000, Blemmer PP-500, Blemmer PP-800, Blemmer PP-1000, Blemmer AP-150, Blemmer AP-400, Blemmer AP-550, Blemmer AP-800, Blemmer 50PEP-300, Blemmer 50POEP-800B, and Blemmer 43PAPE600B (products of NOF Corporation).

The aforementioned components (a) to (d) may be employed singly or in combination of two or more species.

Next will be described the amount of each of the aforementioned components (a) to (c) (corresponding to the amount of unneutralized component (the same shall apply hereinafter)) contained in the monomer mixture upon production of the vinyl polymer; or the amount of a structural unit derived from each of components (a) to (c) contained in the vinyl polymer.

The amount of component (a) is preferably 3 to 40 wt. %, more preferably 4 to 30 wt. %, particularly preferably 5 to 25 wt. %, from the viewpoint of reliably dispersing the anionic colorant particles or the composite particles in the water dispersion or the water-based ink.

The amount of component (b) is preferably 1 to 25 wt. %, more preferably 5 to 20 wt. %, from the viewpoint of dispersion stability of the anionic colorant particles or the composite particles in the water dispersion or the water-based ink.

The amount of component (c) is preferably 5 to 98 wt. %, more preferably 10 to 80 wt. %, from the viewpoint of improvement in optical density of a printed image provided by the water dispersion or the water-based ink.

The ratio by weight of component (a) to [component (b)+ component (c)] is preferably 0.01 to 1, more preferably 0.02 to 0.67, much more preferably 0.03 to 0.50, from the viewpoints of dispersion stability of the anionic colorant particles or the composite particles in the water dispersion or the water-based ink, as well as optical density of a printed image provided by the water dispersion or the water-based ink.

(Production of Anionic Polymer)

The aforementioned anionic polymer is produced by copolymerization of the monomer mixture through any known polymerization technique, such as bulk polymerization, solution polymerization, suspension polymerization, or emulsion polymerization. Of these polymerization techniques, solution polymerization is preferably employed.

The solvent employed in solution polymerization is preferably a polar organic solvent. When a water-miscible polar organic solvent is employed, the organic solvent may be mixed with water. Examples of the polar organic solvent include C1 to C3 aliphatic alcohols such as methanol, ethanol, and propanol; ketones such as acetone and methyl ethyl ketone; and esters such as ethyl acetate. Of these, preferred is methanol, ethanol, acetone, methyl ethyl ketone, or a solvent mixture of water and one or more species of these organic solvents.

For polymerization, there may be employed any known radical polymerization initiator; for example, an azo compound such as 2,2'-azobisisobutyronitrile or 2,2'-azobis(2,4-dimethylvaleronitrile), or an organic peroxide such as t-butyl peroxyoctoate or dibenzoyl peroxide. The amount of a radical polymerization initiator employed is preferably 0.001 to 5 mol, more preferably 0.01 to 2 mol, on the basis of 1 mol of the monomer mixture (i.e., the total amount (1 mol) of the monomers).

For polymerization, there may also be added any known chain transfer agent, such as a mercaptan (e.g., octyl mercaptan or 2-mercaptoethanol) or thiuram disulfide.

The polymerization conditions of the monomer mixture vary with, for example, the type of the radical polymerization initiator, monomers, or solvent employed, and cannot be unequivocally determined. However, generally, the polymerization temperature is preferably 30 to 100° C., more preferably 50 to 80° C., and the polymerization time is preferably 1 to 20 hours. Preferably, polymerization is carried out in a nitrogen gas atmosphere or an atmosphere of inert gas (e.g., argon).

After completion of polymerization reaction, the thus-produced polymer may be isolated from the reaction mixture through any known technique such as reprecipitation or solvent removal through evaporation. Unreacted monomer, etc. may be removed by subjecting the thus-produced polymer to, for example, reprecipitation, membrane separation, chromatography, or extraction.

The anionic polymer employed in the present invention preferably has a weight average molecular weight of 5,000 to 500,000, more preferably 10,000 to 400,000, still more preferably 10,000 to 300,000, much more preferably 20,000 to 300,000, from the viewpoints of dispersion stability of the anionic colorant particles or the composite particles in the water dispersion or the water-based ink, as well as optical density of a printed image provided by the water dispersion or the water-based ink. The weight average molecular weight of the anionic polymer was determined through the method described in the Examples hereinbelow.

In the anionic polymer employed in the present invention, preferably, the anionic groups derived from the anionic monomer (a) are neutralized with a neutralizing agent. Examples of the neutralizing agent include bases such as sodium hydroxide, potassium hydroxide, and amines.

The degree of neutralization of the anionic groups of the anionic polymer is preferably 10 to 300%, more preferably 20 to 200%, much more preferably 30 to 150%, from the viewpoint of dispersion stability of the anionic colorant particles in the water-based ink.

In the case where the anionic polymer is cross-linked, the neutralization degree of the anionic groups of the polymer before cross-linking is preferably 10 to 90%, more preferably 20 to 80%, much more preferably 30 to 70%, from the viewpoints of dispersion stability of the anionic colorant particles or the composite particles in the water dispersion or the water-based ink, as well as effective cross-linking.

The neutralization degree can be determined by use of the following formula:

{[the weight of a neutralizing agent (g)/the equivalent of the neutralizing agent]/[the acid value of the anionic polymer (KOH mg/g)×the weight of the anionic polymer (g)/(56×1000)]}×100.

The acid value of the anionic polymer may be calculated on the basis of the structural units of the polymer. Alternatively, the acid value may be determined by dissolving the anionic polymer in an appropriate solvent (e.g., methyl ethyl ketone), followed by titration.

[Production of Colorant-Containing Anionic Polymer Particles]

The water dispersion of colorant-containing anionic polymer particles can be effectively produced through a process including the following steps (1) and (2):

step (1): a step of subjecting a mixture containing an anionic polymer, an organic solvent, a colorant, and water to dispersion treatment, to thereby prepare a dispersion of colorant-containing anionic polymer particles; and step (2): a step of removing the organic solvent from the dispersion prepared in step (1), to thereby produce a water dispersion of colorant-containing anionic polymer particles.

Step (1)

Preferably, in step (1), firstly, an anionic polymer is dissolved in an organic solvent, and subsequently a colorant and water (and optionally a neutralizing agent, a surfactant, etc.) are added to and mixed with the resultant organic solvent solution, to thereby produce an oil-in-water dispersion. No particular limitation is imposed on the order of addition of components (other than the anionic polymer) to the organic solvent solution of the anionic polymer. However, preferably, the neutralizing agent, water, and the colorant are added to the solution in this order.

In the resultant mixture, the amount of the colorant is preferably 5 to 50 wt. %, more preferably 10 to 40 wt. %; the amount of the organic solvent is preferably 10 to 70 wt. %, more preferably 10 to 50 wt. %; the amount of the anionic polymer is preferably 2 to 40 wt. %, more preferably 3 to 20 wt. %; and the amount of water is preferably 10 to 70 wt. %, more preferably 20 to 70 wt. %.

The ratio by weight of the amount of the colorant to the total amount of the anionic polymer and the colorant; i.e., [colorant/(anionic polymer+colorant)], is preferably 50/100 to 90/100, more preferably 70/100 to 85/100, from the viewpoint of dispersion stability of the anionic colorant particles or the composite particles in the water dispersion or the water-based ink.

When a neutralizing agent is employed, preferably, neutralization is carried out so that the finally produced water dispersion exhibits a pH of 7 to 11. Examples of the neutralizing agent include bases such as sodium hydroxide, potassium hydroxide, and amines. The anionic polymer may be neutralized in advance.

Examples of the organic solvent employed include alcohol solvents such as ethanol, isopropanol, and isobutanol; ketone solvents such as acetone, methyl ethyl ketone, methyl isobutyl ketone, and diethyl ketone; and ether solvents such as dibutyl ether, tetrahydrofuran, and dioxane. These solvents may be employed singly or in combination of two or more species.

The amount of such an organic solvent dissolved in 100 g of water at 20° C. is preferably 5 g or more, more preferably 10 g or more. The organic solvent employed is preferably methyl ethyl ketone or methyl isobutyl ketone.

No particular limitation is imposed on the method for dispersing the mixture in step (1). The colorant-containing anionic polymer particles may be formed into fine particles having a desired average particle size only through a main dispersion process. However, preferably, the mixture is subjected to a preliminary dispersion process and then to the main dispersion process under application of shear stress, so that the colorant-containing anionic polymer particles have a desired average particle size. Dispersion in step (1) is preferably carried out at 5 to 50° C., more preferably at 10 to 35° C. The dispersion time is preferably 1 to 30 hours, more preferably 2 to 25 hours.

Preliminary dispersion of the mixture is carried out by means of a generally used mixing/stirring device, such as an anchor blade or a disper blade. Specific examples of preferred mixing/stirring devices include high-speed stirring/mixing devices, such as Ultra Disper and Despa Mill (trade name, Asada Iron Works Co., Ltd.); Milder (trade name, Ebara Corporation and Pacific Machinery & Engineering Co., Ltd.); and T.K. Homo Mixer, T.K. Pipeline Mixer, T.K. Homo Jetter, T.K. Homomic Line Flow, and Filmix (trade name, Primix Corporation).

Examples of the means for application of shear stress in the main dispersion process include kneading machines such as a roll mill, a kneader, and an extruder; homo-valve-type high-pressure homogenizers such as High-Pressure Homogenizer (trade name, Izumi Food Machinery Co., Ltd.); chamber-type high-pressure homogenizers such as Microfluidizer (trade name, Microfluidics Inc.), Nanomizer (trade name, Yoshida Kikai Co., Ltd.), and Altimizer and Starburst (trade name, Sugino Machine Limited); and medium-type dispersers such as a paint shaker and a bead mill. Examples of commercially available medium-type dispersers include Ultra Apex Mill (trade name, Kotobuki Industries Co., Ltd.), Pico Mill (trade name, Asada Iron Works Co., Ltd.), and Dyno-Mill (trade name, Shinmaru Enterprises Corporation). A plurality of these apparatuses may be employed in combination. Among these apparatuses, preferably, a medium-type disperser and a high-pressure homogenizer are employed in combination, from the viewpoint of reduction in particle size of the colorant-containing anionic polymer particles.

Step (2)

In step (2), the organic solvent is removed through evaporation, by a known technique, from the dispersion produced in step (1), to thereby produce a water dispersion of the colorant-containing anionic polymer particles. Preferably, the organic solvent is substantially completely removed from the thus-obtained water dispersion of the anionic polymer particles. However, the organic solvent may remain in the water dispersion, so long as the effects of the present invention are not impeded. When cross-linking is carried out after this step, the organic solvent may optionally be further removed after cross-linking. The amount of the organic solvent remaining in the finally produced water dispersion of the anionic polymer particles is preferably 0.1 wt. % or less, more preferably 0.01 wt. % or less.

Optionally, the dispersion may be thermally treated under stirring before removal of the organic solvent through evaporation.

In the thus-produced water dispersion of the colorant-containing anionic polymer particles, solid particles of the colorant-containing anionic polymer are dispersed in water serving as a main medium. No particular limitation is imposed on the form of the anionic polymer particles, so long as the colorant and the anionic polymer form particles. Examples of the form of the anionic polymer particles include particles of the anionic polymer into which the colorant has been incorporated; particles of the anionic polymer in which the colorant is uniformly dispersed; and particles of the anionic polymer on which the colorant is exposed.

[Colorant-Containing Anionic Cross-Linked Polymer Particles and Production Thereof]

When the anionic colorant particles employed in the present invention are colorant-containing anionic polymer particles, the anionic colorant particles are preferably colorant-containing anionic cross-linked polymer particles, from the viewpoint of storage stability of the anionic colorant particles or the composite particles in the water dispersion or the water-based ink.

When a water dispersion of composite particles formed of cationic polymer particles and the colorant-containing anionic polymer particles adhering thereto is produced through step (a) described hereinbelow, preferably, step (b) is carried out after step (a), to thereby produce the anionic cross-linked polymer particles in the form of a water dispersion of composite particles of cationic polymer particles and the anionic cross-linked polymer particles adhering thereto. When the water-based ink is produced through step (B) described hereinbelow, preferably, the colorant-containing anionic cross-linked polymer particles are produced through the following step (3):

step (3): a step of adding a cross-linking agent to the water dispersion of the colorant-containing anionic polymer particles, to thereby produce colorant-containing anionic cross-linked polymer particles.

Step (3)

In step (3), a cross-linking agent is added to the water dispersion of the colorant-containing anionic polymer particles produced in step (2), to thereby produce a water dispersion of colorant-containing anionic cross-linked polymer particles. Step (3) is preferably carried out, from the viewpoint of improvement in storage stability of the anionic polymer particles in the water dispersion or the water-based ink.

Cross-linking of the anionic polymer may be carried out by mixing a cross-linking agent with the dispersion of the colorant-containing anionic polymer particles produced in step (1). In this case, the water dispersion may be produced by removing the organic solvent, in a manner similar to that of step (2), from the dispersion of cross-linked polymer particles obtained through cross-linking.

The cross-linking agent employed is preferably a compound having a functional group which reacts with the anionic groups of the anionic polymer, more preferably a compound having, in the molecule, two or more, preferably two to six functional groups which react with the anionic groups.

In the present invention, the amount of the cross-linking agent dissolved in 100 g of water at 25° C. is preferably 50 g or less, more preferably 40 g or less, much more preferably 30 g or less, from the viewpoint of effective cross-linking of the surface of the anionic polymer (in particular, water-insoluble anionic polymer). The cross-linking agent preferably has a molecular weight of 120 to 2,000, more preferably 150 to 1,500, much more preferably 150 to 1,000, from the viewpoints of high reactivity, as well as storage stability of the anionic polymer particles in the water-based ink.

(Cross-Linking Agent)

Examples of preferred cross-linking agents include the following compounds (a) to (c):

(a) compounds having in the molecule two or more epoxy groups; for example, polyglycidyl ethers such as ethylene glycol diglycidyl ether, polyethylene glycol diglycidyl ether, polypropylene glycol diglycidyl ether, glycerin triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, and hydrogenated bisphenol A diglycidyl ether;

(b) compounds having in the molecule two or more oxazoline groups; for example, bisoxazoline compounds such as 2,2'-bis(2-oxazoline), 1,3-phenylene-bis-oxazoline, and 1,3-benzobisoxazoline, and compounds having terminal oxazoline groups obtained through reaction between such a bisoxazoline compound and a polybasic carboxylic acid; and (c) compounds having in the molecule two or more isocyanate groups; for example, organic polyisocyanates and isocyanate-terminal prepolymers.

Of these cross-linking agents, (a) compounds having in the molecule two or more epoxy groups is preferred, with ethylene glycol diglycidyl ether or trimethylolpropane polyglycidyl ether being particularly preferred.

Regarding the amount of the cross-linking agent employed, the ratio by weight of the cross-linking agent to the anionic polymer [i.e., cross-linking agent/anionic polymer] is preferably 0.1/100 to 50/100, more preferably 0.5/100 to 40/100, still more preferably 1/100 to 30/100, much more preferably 2/100 to 25/100, from the viewpoint of storage stability of the anionic polymer particles in the water dispersion or the water-based ink.

The amount of the cross-linking agent employed (as reduced to amount by mole of the reactive groups of the cross-linking agent) is preferably 0.01 to 10 mmol, more preferably 0.05 to 5 mmol, much more preferably 0.1 to 2 mmol, on the basis of 1 g of the anionic polymer.

In the water dispersion of the colorant-containing anionic cross-linked polymer particles produced in step (3), the anionic cross-linked polymer preferably contains an anionic group (preferably, a carboxy group) neutralized with a base in an amount of 0.5 mmol or more on the basis of 1 g of the cross-linked polymer. Conceivably, the cross-linked polymer dissociates in the water dispersion, and contributes to stability of the colorant-containing anionic cross-linked polymer particles by means of charge repulsion between anions.

The percent cross-linking (mol %) of the cross-linked polymer, which is determined by use of the following formula (I), is preferably 10 to 90 mol %, more preferably 20 to 80 mol %, much more preferably 30 to 70 mol %. The percent cross-linking can be calculated from the amount of the cross-linking agent employed, the amount by mole of the reactive groups thereof, the amount of the polymer employed, and the amount by mole of the reactive groups of the polymer capable of reacting with the reactive groups of the cross-linking agent.

Percent cross-linking (mol %)=[the amount by mole of the reactive groups of a cross-linking agent/the amount by mole of the reactive groups of a polymer capable of reacting with the cross-linking agent]×100     (I)

"The amount by mole of the reactive groups of a cross-linking agent" in formula (I) is obtained by multiplying the amount by mole of the cross-linking agent by the number of reactive groups in one molecule of the cross-linking agent.

[Cationic Polymer Particles]

The cationic polymer particles are preferably water-insoluble polymer particles which can be dispersed in the form of polymer emulsion in a continuous aqueous medium in the presence or absence of a surfactant. Particularly preferably, the cationic polymer particles are (i) polymer particles formed through emulsion polymerization of an ethylenic unsaturated monomer, or (ii) self-emulsifying polymer particles having a structural unit derived from a cationic monomer. As used herein, the term "self-emulsifying polymer particles" refers to water-insoluble polymer particles which are in the form of emulsion in water by virtue of a functional group (preferably, a basic group or a salt thereof) of the polymer itself in the absence of a surfactant. The cationic polymer particles may be colorant-containing cationic polymer particles.

As used herein, the term "cationic" refers to the case where, when an unneutralized compound or the like is dispersed or dissolved in pure water, the resultant dispersion or solution exhibits a pH of greater than 7; or the case where, when an unneutralized compound or the like is insoluble in pure water, the dispersion of the compound or the like dispersed in pure water exhibits a positive zeta potential.

As used herein, "water-insoluble polymer" refers to a polymer which, when dried to constant mass at 105° C. for two hours, dissolves in an amount of 10 g or less (preferably 5 g or less, more preferably 1 g or less) in 100 g of water at 25° C. When the cationic polymer has basic groups, the amount of the polymer dissolved in water corresponds to that as determined when the basic groups are 100% neutralized. When the counter ion for neutralizing the basic groups is not specifically shown, the amount of the cationic polymer dissolved in water corresponds to that as determined when the basic groups are neutralized with hydrochloric acid (counter ion: chloride ion).

The cationic polymer particles preferably have an average particle size of 10 to 1,000 nm, more preferably 50 to 500 nm, much more preferably 80 to 300 nm, from the viewpoint of optical density of a printed image provided by the water dispersion or the water-based ink. Average particle size can be determined through the method described in the Examples hereinbelow.

Specific examples of the polymer forming the polymer particles include (meth)acrylic polymer, vinyl acetate polymer, styrene-butadiene polymer, vinyl chloride polymer, styrene-(meth)acrylic polymer, butadiene polymer, and styrenic polymer. Of these, (meth)acrylic polymer, styrene-(meth) acrylic polymer, and styrenic polymer are preferred, and styrene-(meth)acrylic polymer and styrenic polymer are more preferred, with styrenic polymer being much more preferred.

The polymer employed in the colorant-containing cationic polymer particles is preferably one produced in a manner similar to that in the case of the aforementioned anionic polymer, from the viewpoint of dispersion stability of the polymer particles in the water dispersion or the water-based ink. An embodiment of the production of the polymer particles will be described hereinbelow.

These types of polymer particles may be employed singly or in combination of two or more species.

(Cationic Monomer)

The cationic polymer particles may be produced through polymerization of at least one cationic monomer.

Examples of the cationic monomer include a monomer having an amino group, an acid-neutralized product of a monomer having an amino group, a quaternary ammonium salt obtained through quaternization of the monomer with a quaternizing agent, and a diallyl quaternary ammonium salt.

The monomer having an amino group is preferably one or more species selected from among a (meth)acrylic acid ester having a dialkylamino group, a (meth)acrylamide having a dialkylamino group, a styrene compound having a dialkylamino group, a vinylpyridine compound, an N-vinyl heterocyclic compound, and a vinyl ether.

Examples of the (meth)acrylic acid ester having a dialkylamino group include dimethylaminoethyl(meth)acrylate, diethylaminoethyl(meth)acrylate, dipropylaminoethyl (meth)acrylate, diisopropylaminoethyl(meth)acrylate, dibutylaminoethyl(meth)acrylate, diisobutylaminoethyl(meth) acrylate, and di-t-butylaminoethyl(meth)acrylate.

Examples of the (meth)acrylamide having a dialkylamino group include dimethylaminopropyl(meth)acrylamide, diethylaminopropyl(meth)acrylamide, dipropylaminopropyl (meth)acrylamide, diisopropylaminopropyl(meth)acrylamide, dibutylaminopropyl(meth)acrylamide, diisobutylaminopropyl(meth)acrylamide, and di-t-butylaminopropyl (meth)acrylamide.

Examples of the styrene compound having a dialkylamino group include dimethylaminostyrene and dimethylaminomethylstyrene. Examples of the vinylpyridine compound include 4-vinylpyridine and 2-vinylpyridine. Examples of the N-vinyl heterocyclic compound include N-vinylimidazole. Examples of the vinyl ether include aminoethyl vinyl ether and dimethylaminoethyl vinyl ether.

The acid-neutralized product of a monomer having an amino group, the quaternary ammonium salt obtained through quaternization of the monomer with a quaternizing agent, and the diallyl quaternary ammonium salt are preferably compounds represented by the following formula (1) and/or formula (2). Particularly, a quaternary ammonium salt monomer is more preferred, since it exhibits good dispersion stability even when the pH of the system changes.

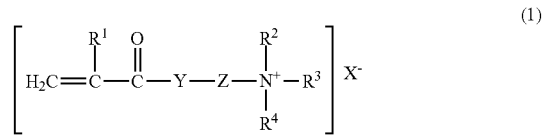

In formula (1), $R^1$ represents a hydrogen atom or a methyl group; each of $R^2$ and $R^3$ represents a C1 to C4 alkyl group, an alkenyl group, or a benzyl group; $R^4$ represents a hydrogen atom, a C1 to C4 alkyl group, or a benzyl group; Y represents —O—, —NH—, or —O—CH$_2$CH(OH)—; Z represents a C1 to C4 linear or branched alkanediyl group; and X represents an anion.

Examples of the C1 to C4 alkyl group represented by $R^2$, $R^3$, or $R^4$ in formula (1) include a methyl group, an ethyl group, an n-propyl group, an isopropyl group, and various butyl groups. Examples of the group represented by Z include a methylene group, an ethylene group, a trimethylene group, a propan-1,2-diyl group, and a tetramethylene group.

Examples of the anion represented by X include a halide ion, a conjugate base of an acid, and a C1 to C4 alkyl sulfate ion. Examples of the halide ion include chloride ion, bromide ion, and iodide ion. Examples of the conjugate base of an acid include a group obtained through removal of a hydrogen atom from a preferred acid (as described below) for forming an acid-neutralized product.

Specific examples of preferred compounds represented by formula (1) include (meth)acryloyloxyethyltrimethylammonium chloride, (meth)acryloyloxyethyltriethylammonium chloride, (meth)acryloyloxyethyldimethylbenzylammonium chloride, (meth)acryloyloxypropyltrimethylammonium chloride, and (meth)acryloyloxybutyltrimethylammonium chloride. Of these, (meth)acryloyloxyethyltrimethylammonium chloride and (meth)acryloyloxypropyltrimethylammonium chloride are preferred.

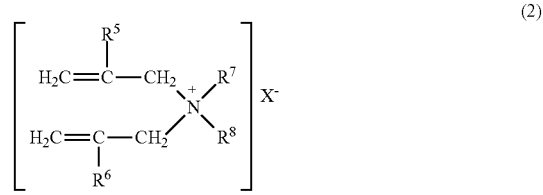

In formula (2), each of $R^5$ and $R^6$ represents a hydrogen atom or a methyl group; each of $R^7$ and $R^8$ represents a hydrogen atom or a C1 to C4 alkyl group; and X has the same meaning as defined above.

Specific examples of the compound represented by formula (2) include diallyl quaternary ammonium salts, such as dimethyldiallylammonium chloride and diethyldiallylammonium chloride. Preferred is dimethyldiallylammonium chloride.

When the compound represented by formula (1) or (2) is an acid-neutralized product, examples of preferred acids employed for forming the acid-neutralized product include hydrochloric acid, sulfuric acid, nitric acid, acetic acid, formic acid, maleic acid, fumaric acid, citric acid, tartaric acid, adipic acid, sulfamic acid, toluenesulfonic acid, lactic acid, pyrrolidone-2-carboxylic acid, and succinic acid.

When the compound represented by formula (1) or (2) is a quaternary ammonium salt, preferred quaternizing agents employed for forming the quaternary ammonium salt include an alkylating agent such as an alkyl halide (e.g., methyl chloride, ethyl chloride, methyl bromide, or methyl iodide), a dialkyl sulfate (e.g., dimethyl sulfate, diethyl sulfate, or di-n-propyl sulfate), and benzyl chloride.

The cationic polymer particles may contain a monomer-derived structural unit other than the aforementioned cationic-monomer-derived structural unit. Next will be described preferred monomer-derived structural units other than the cationic-monomer-derived structural unit of the colorant-containing cationic polymer particles.

Preferably, the cationic polymer particles contain, as a monomer-derived structural unit other than the cationic-monomer-derived structural unit, a structural unit derived from the aforementioned hydrophobic monomer (c). Examples of the hydrophobic monomer (c) include the aforementioned alkyl(meth)acrylates, alkyl(meth)acrylamides, and aromatic-group-containing monomers. Preferred are alkyl(meth)acrylates and styrenic monomers.

Preferably, the cationic polymer particles contain a structural unit derived from a polyfunctional monomer, from the viewpoint of storage stability of the water dispersion or the water-based ink. The polyfunctional monomer may be, for example, divinylbenzene.

The cationic polymer particles may also contain a structural unit derived from the aforementioned nonionic monomer (d).

The amount of the cationic-monomer-derived structural unit contained in the cationic polymer is preferably 0.1 to 40 wt. %, more preferably 1 to 30 wt. %, still more preferably 2 to 20 wt. %, much more preferably 3 to 10 wt. %, from the viewpoint of dispersion stability of the polymer particles in the water dispersion or the water-based ink.

The amount of a cationic monomer whose structure is changed through neutralization (e.g., a monomer having an amino group) is calculated as the amount of an acid-neutralized product employed upon production of the water dispersion or the water-based ink.

When the cationic polymer contains a structural unit derived from the hydrophobic monomer (c), the amount of the structural unit contained in the cationic polymer is preferably 50.0 to 99.9 wt. %, more preferably 60.0 to 99.5 wt. %, much more preferably 70.0 to 99.0 wt. %, from the viewpoint of dispersion stability of the resultant polymer particles in the water dispersion or the water-based ink.

In the cationic polymer, the ratio by weight of [(the structural unit derived from the cationic monomer)/(the structural unit derived from the hydrophobic monomer (c))] is preferably 1/1,000 to 1/2, more preferably 1/300 to 1/3, much more preferably 1/20 to 1/10, from the viewpoint of dispersion stability of the polymer particles in the water dispersion or the water-based ink.

The amount of the polyfunctional-monomer-derived structural unit contained in the cationic polymer is preferably 0.1 to 10 wt. %, more preferably 2 to 5 wt. %.

(Production of Cationic Polymer Particles)

When the cationic polymer particles are polymer particles produced through emulsion polymerization of an ethylenic unsaturated monomer, any known emulsion polymerization technique may be employed for the production of the polymer particles. When the cationic polymer particles are colorant-containing cationic polymer particles, as described below in detail, the polymer particles may be produced in a manner similar to that in the case of the aforementioned colorant-containing anionic polymer particles.

Emulsion polymerization is carried out by use of a surfactant and a monomer. Depending on the amount and type of a cationic monomer selected, soap-free polymerization can be carried out without use of a surfactant, which is preferred.

No particular limitation is imposed on the surfactant employed for emulsion polymerization, but the surfactant is preferably a cationic surfactant or a nonionic surfactant. Such surfactants may be employed singly or in combination of two or more species. Particularly, a cationic surfactant is preferably employed.

Examples of the cationic surfactant include an alkylamine salt, a quaternary ammonium salt, an alkyl betaine, and an alkylamine oxide.

Examples of the alkylamine salt include laurylamine acetate and stearylamine acetate. Examples of the quaternary ammonium salt include alkyltrimethylammonium chlorides such as lauryltrimethylammonium chloride, stearylammonium chloride, and cetylammonium chloride; dialkyldimethylammonium chlorides such as distearylammonium chloride; and alkylbenzyldimethylammonium chlorides.

Examples of the alkyl betaine include lauryl betaine and stearyl betaine. Examples of the alkylamine oxide include 2-alkyl-N-carboxymethyl-N-hydroxyethylimidazolium betaine and lauryldimethylamine oxide.

Examples of the nonionic surfactant include polyoxyalkylene alkyl ethers, esters formed of alcohols and poly-fatty acids, polyoxyalkylene aliphatic amines, ester compounds formed of fatty acids and polyhydric alcohols, and compounds formed through addition of alkylene oxides to such ester compounds.

Examples of the polymerization initiator employed for polymerization include an inorganic peroxide, an organic initiator, and a redox polymerization initiator, which are known in the art. Examples of the inorganic peroxide include potassium persulfate and ammonium persulfate. Examples of the organic initiator include organic peroxides, and azo initiators such as azobisisobutyronitrile and 2,2'-azobis(2-methylpropionamidine)dihydrochloride. Examples of the redox polymerization initiator include combinations of a peroxide or an oxidizing agent and a reducing agent such as sodium hydrogensulfite, sodium thiosulfate, ferrous sulfate, or a sugar. Particularly, 2,2'-azobis(2-methylpropionamidine)dihydrochloride is preferably employed.

[Colorant-Containing Cationic Polymer Particles]

(Cationic Polymer Employed for Colorant-Containing Cationic Polymer Particles)

The cationic polymer employed for the colorant-containing cationic polymer particles is preferably a vinyl polymer produced through copolymerization of a monomer mixture containing a cationic monomer.

The cationic polymer may contain, in addition to the aforementioned cationic-monomer-derived structural unit, a structural unit derived from any of the aforementioned components (b), (c), and (d). Particularly, the cationic polymer preferably contains a structural unit derived from component (c).

Next will be described the monomer components (i.e., structural units) forming the polymer of the pigment-containing cationic polymer particles.

The macromer (b) is as described above and preferably a styrenic macromer.

The hydrophobic monomer (c) is as described above and employed from the viewpoint of improvement in optical density.

Component (c) is preferably an aromatic-group-containing monomer, more preferably a styrenic monomer or an aromatic-group-containing (meth)acrylate. These may be employed in combination. Of these, an aromatic-group-containing (meth)acrylate is much more preferred.

The styrenic monomer is preferably styrene, 2-methylstyrene, or divinylbenzene, more preferably styrene.

The aromatic-group-containing (meth)acrylate is preferably, for example, benzyl(meth)acrylate or phenoxyethyl (meth)acrylate, more preferably benzyl(meth)acrylate.

The nonionic monomer (d) is as described above. Examples of the nonionic monomer (d) include polyethylene glycol (n=1 to 30, "n" represents the average molar number of addition of oxyalkylene groups (the same shall apply hereinafter)) (meth)acrylate, and polypropylene glycol (n=1 to 30) (meth)acrylate.

The aforementioned cationic monomer and components (b) to (d) may be employed singly or in combination of two or more species.

Next will be described the amount of each of the aforementioned cationic monomer and components (b) and (c) (corresponding to the amount of unneutralized component (the same shall apply hereinafter)) contained in the monomer mixture upon production of the cationic polymer; or the amount of a structural unit derived from each of the cationic monomer and components (b) and (c) contained in the cationic polymer.

The amount of the cationic monomer is preferably 5 to 50 wt. %, more preferably 10 to 40 wt. %, much more preferably 20 to 30 wt. %, from the viewpoints of dispersion stability of the colorant-containing cationic polymer particles and optical density.

The amount of component (b) is preferably 0 to 20 wt. %, more preferably 0 to 10 wt. %, from the viewpoint of dispersion stability of the cationic polymer particles.

The amount of component (c) is preferably 30 to 95 wt. %, more preferably 60 to 80 wt. %, from the viewpoint of improvement in optical density of a printed image provided by the water dispersion or the water-based ink.

The ratio by weight of [the cationic monomer/[component (b)+component (c)]] is preferably 0.01 to 1, more preferably 0.05 to 0.67, much more preferably 0.10 to 0.50, from the viewpoints of dispersion stability of the colorant-containing cationic polymer particles, as well as optical density of a printed image provided by the water dispersion or the water-based ink.

The aforementioned cationic polymer may be produced in a manner similar to that in the case of the anionic polymer. Preferably, the cationic polymer is produced through solution polymerization.

When the polymer employed in the present invention has cationic groups derived from the cationic monomer, preferably, the cationic groups are neutralized with a neutralizing agent. Examples of the neutralizing agent include acids such as hydrochloric acid, acetic acid, and propionic acid.

The neutralization degree of the cationic groups of the polymer is preferably 10 to 300%, more preferably 40 to 200%, much more preferably 60 to 150%, from the viewpoint of dispersion stability.

Neutralization may be carried out to a relevant monomer before polymerization or to a produced polymer, but is preferably carried out after production of the polymer.

The polymer having quaternalized cationic groups may be produced from a quaternarized monomer or through quaternization of a produced polymer. However, preferably, quaternization is carried out to a monomer before polymerization, from the viewpoint of reactivity.

[Production of Colorant-Containing Cationic Polymer Particles]

Similar to the case of the aforementioned colorant-containing anionic polymer particles, the water dispersion of colorant-containing cationic polymer particles can be effectively produced through a process including the following steps (4) and (5):

step (4): a step of subjecting a mixture containing a cationic polymer, an organic solvent, a colorant, and water to dispersion treatment, to thereby prepare a dispersion of colorant-containing cationic polymer particles; and step (5): a step of removing the organic solvent from the dispersion prepared in step (4), to thereby produce a water dispersion of colorant-containing cationic polymer particles.

Steps (4) and (5) are basically the same as the aforementioned steps (1) and (2) for the production of the anionic polymer particles, except that a different type of polymer is employed.

Preferably, in step (4), firstly, a cationic polymer is dissolved in an organic solvent, and subsequently a colorant and water (and optionally a neutralizing agent, a surfactant, etc.) are added to and mixed with the resultant organic solvent solution, to thereby produce an oil-in-water dispersion. No particular limitation is imposed on the order of addition of components (other than the cationic polymer) to the organic solvent solution of the cationic polymer. However, preferably, the neutralizing agent, water, and the colorant are added to the solution in this order.

In the resultant mixture, the amount of the colorant is preferably 5 to 50 wt. %, more preferably 10 to 40 wt. %; the amount of the organic solvent is preferably 10 to 70 wt. %, more preferably 10 to 50 wt. %; the amount of the cationic polymer is preferably 2 to 40 wt. %, more preferably 3 to 20 wt. %; and the amount of water is preferably 10 to 70 wt. %, more preferably 20 to 70 wt. %.

The ratio by weight of the amount of the colorant to the amount of the cationic polymer; i.e., [colorant/cationic polymer], is preferably 50/50 to 90/10, more preferably 70/30 to 85/15, from the viewpoint of dispersion stability of the colorant-containing cationic polymer particles in the water dispersion.

When a neutralizing agent is employed, preferably, neutralization is carried out so that the finally produced water dispersion exhibits a pH of 1 to 7. Examples of the neutralizing agent include acids such as hydrochloric acid, acetic acid, and propionic acid. The cationic polymer may be neutralized in advance.

The organic solvent employed may be the same as that employed in the aforementioned step (1).

No particular limitation is imposed on the method for dispersing the mixture in step (4), but preferably, the dispersing method employed in production of the aforementioned anionic polymer particles is employed. Preferably, a preliminary dispersion process is carried out by means of, for example, a high-speed stirring/mixing device, and subsequently a main dispersion process is carried out by means of a disperser (e.g., a medium-type disperser or a high-pressure homogenizer).

In step (5), the organic solvent is removed through evaporation from the dispersion produced in step (4). In the thus-produced water dispersion of the colorant-containing cationic polymer particles, solid particles of the colorant-containing polymer are dispersed in water serving as a main medium. No particular limitation is imposed on the form of the polymer particles, so long as the colorant and the cationic polymer form particles. Examples of the form of the polymer particles include particles of the polymer into which the colorant has been incorporated; particles of the polymer in which the colorant is uniformly dispersed; and particles of the polymer on which the colorant is exposed.

[Production of Water Dispersion for Ink-Jet Printing]

The water dispersion for ink-jet printing of the present invention, which contains composite particles formed of the cationic polymer particles and the anionic colorant particles adhering thereto, can be produced through a process including the following step (a):

step (a): a step of mixing the water dispersion of the anionic colorant particles with the water dispersion of the cationic polymer particles, to thereby produce a water dispersion of composite particles formed of the cationic polymer particles and the anionic colorant particles adhering thereto.

When the anionic colorant particles are colorant-containing anionic polymer particles, preferably, the water dispersion for ink-jet printing is produced through a process including step (a) and the subsequent step (b):

step (b): a step of adding a cross-linking agent to the water dispersion of the composite particles produced in step (a), to thereby produce a water dispersion of composite particles formed of the cationic polymer particles and colorant-containing anionic cross-linked polymer particles adhering thereto.

Step (a)

In step (a), the water dispersion of the anionic colorant particles is mixed with the water dispersion of the cationic polymer particles. The water dispersion of the anionic colorant particles employed in this step is preferably the water dispersion of the colorant-containing anionic polymer particles produced in the aforementioned step (2).

When these water dispersions are mixed, these two types of the particles are electrically bonded, to thereby produce a water dispersion for ink-jet printing containing composite particles formed of the cationic polymer particles and the pigment-containing anionic polymer particles adhering thereto. Preferably, dispersion treatment is further carried out after mixing of the aforementioned water dispersions. This dispersion treatment produces composite particles having a uniform particle size.

Any of the dispersers described above in step (1) may be employed for dispersion treatment. Examples of the dispersers include kneading machines such as a roll mill; homo-valve-type high-pressure homogenizers such as High-Pressure Homogenizer; chamber-type high-pressure homogenizers such as Microfluidizer (trade name), Nanomizer (trade name), Altimizer (trade name), and Starburst (trade name); and medium-type dispersers such as a paint shaker and a bead mill. Examples of commercially available medium-type dispersers include Ultra Apex Mill (trade name), Pico Mill (trade name), and Dyno-Mill (trade name). Dispersion treatment may be carried out by means of an ultrasonic disperser (preferably, an ultrasonic homogenizer). In a preferred ultrasonic homogenizer employed, frequency is 20 to 2,000 kHz, and wattage is preferably 20 to 1,000 W, more preferably 50 to 800 W, on the basis of the total amount (1 L) of a reaction mixture. Such an ultrasonic disperser is commercially available from, for example, Nihonseiki Kaisha Ltd. or Alex Corporation. A plurality of the aforementioned dispersers may be employed in combination.

The aforementioned dispersion treatment is preferably carried out at 0 to 50° C., more preferably at 0 to 30° C.

Step (b)

In step (b), a cross-linking agent is added to the water dispersion of the composite particles produced in step (a), to thereby produce a water dispersion of composite particles formed of the cationic polymer particles and colorant-containing anionic cross-linked polymer particles adhering thereto. Step (b) is preferably carried out from the viewpoint of improvement in storage stability of the water dispersion.

Cross-linking of the anionic polymer may be carried out by mixing a cross-linking agent with the dispersion of the colorant-containing anionic polymer particles produced in step (1). In this case, the water dispersion of the present invention can be produced by removing the organic solvent, in a manner similar to that of step (2), from the dispersion of anionic cross-linked polymer particles obtained through cross-linking.

The cross-linking agent employed is preferably a compound having a functional group which reacts with the anionic groups of the anionic polymer, more preferably a compound having, in the molecule, two or more (preferably two to six) functional groups which react with the anionic groups.

In the present invention, the amount of the cross-linking agent dissolved in 100 g of water at 25° C. is preferably 50 g or less, more preferably 40 g or less, much more preferably 30 g or less, from the viewpoint of effective cross-linking of the surface of the anionic polymer (in particular, water-insoluble anionic polymer). The cross-linking agent preferably has a molecular weight of 120 to 2,000, more preferably 150 to 1,500, much more preferably 150 to 1,000, from the viewpoints of high reactivity, and storage stability of the water dispersion.

Examples of preferred cross-linking agents include the aforementioned compounds (a) to (c).

The amount of the cross-linking agent employed is as described above.

In the water dispersion of the composite particles produced in step (b), the anionic cross-linked polymer preferably contains an anionic group (preferably, a carboxy group) neutralized with a base in an amount of 0.5 mmol or more on the basis of 1 g of the cross-linked polymer.

Similar to the case described above, the percent cross-linking (mol %) of the cross-linked polymer, which is determined by use of the aforementioned formula (I), is preferably 10 to 90 mol %, more preferably 20 to 80 mol %, much more preferably 30 to 70 mol %.

The composite particles produced in step (a) or in steps (a) and (b) preferably have an average particle size of 40 to 1,000 nm, more preferably 60 to 600 nm, much more preferably 80 to 300 nm, from the viewpoint of optical density of a printed image provided by the water dispersion or the water-based ink.

Average particle size can be determined through the method described in the Examples hereinbelow.

[Water Dispersion for Ink-Jet Printing]

The water dispersion of the present invention may be employed, as is, as the water-based ink.

The amounts of the respective components of the water dispersion of the present invention are as follows.

The colorant content of the water dispersion of the present invention is preferably 2 to 35 wt. %, more preferably 3 to 30 wt. %, much more preferably 5 to 25 wt. %, from the viewpoint of improvement in optical density of a printed image provided by the water dispersion.

When the colorant is contained only in the anionic colorant particles, the colorant content of the water dispersion corresponds to the amount of the colorant contained in the anionic colorant particles in the water dispersion, whereas when the cationic polymer particles are colorant-containing cationic polymer particles, the colorant content of the water dispersion corresponds the total amount of the colorant contained in the cationic polymer particles and the colorant contained in the anionic colorant particles.

The ratio of the colorant content of the anionic colorant particles to the colorant content of the colorant-containing cationic polymer particles; i.e., [the colorant content of the anionic colorant particles/the colorant content of the colorant-containing cationic polymer particles], is preferably 1/3 to 100/1, more preferably 2/1 to 50/1, much more preferably 5/1 to 30/1, from the viewpoint of improvement in optical density of a printed image provided by the water dispersion.

The water content of the water dispersion is preferably 20 to 90 wt. %, more preferably 30 to 80 wt. %, much more preferably 40 to 70 wt. %.

The water dispersion of the present invention preferably has a pH of 6 to 12, more preferably 7 to 11, much more preferably 8 to 10, from the viewpoint of dispersion stability of the water dispersion.

The water dispersion of the present invention preferably has a surface tension (20° C.) of 30 to 70 mN/m, more preferably 35 to 65 mN/m.

The water dispersion of the present invention preferably has a viscosity (20° C.) at 20 wt. % (solid content) of 1 to 12 mPa·s, more preferably 1 to 9 mPa·s, still more preferably 2 to 6 mPa·s, much more preferably 2 to 5 mPa·s.

[Water-Soluble Organic Solvent]

The water-based ink of the present invention preferably contains a water-soluble organic solvent. Such a water-soluble organic solvent is employed for preventing drying of the ink. When a water-soluble organic solvent is employed in the below-described steps (A-1) or (A-2) in the present invention, the organic solvent exhibits the effect of improving filterability and optical density. As used herein, "water-soluble organic solvent" refers to an organic solvent which is uniformly miscible with water in any proportion.

The water-soluble organic solvent employed preferably has a specific dielectric constant of 1 to 60, more preferably 5 to 50, much more preferably 10 to 20, from the viewpoint of improvement in filterability and optical density. When two or more water-soluble organic solvents are employed in combination, the specific dielectric constant corresponds to that of a mixture of all the water-soluble organic solvents contained in the water-based ink.

The reason why employment of a water-soluble organic solvent having a specific dielectric constant falling within the above range improves optical density and filterability has not yet been elucidated. However, conceivably, this improvement is attributed to that such a water-soluble organic solvent can control the permeability of the ink into a sheet of paper to be printed, and effectively prevents formation of coarse particles due to aggregation of the anionic colorant particles and the cationic polymer particles employed in the present invention. Specific dielectric constant is determined through the method described in the Examples hereinbelow.

Specific examples of the water-soluble organic solvent include C1 to C3 aliphatic alcohols such as ethanol and methanol; C2 to C8 alkanediols such as ethylene glycol and 1,2-hexanediol; polyalkylene (C2 to C4) glycol alkyl (C2 to C6) ethers such as triethylene glycol monobutyl ether; glycerin; and 2-pyrrolidone. Glycerin and polyalkylene glycol alkyl ethers are preferred, and polyalkylene glycol alkyl ethers are more preferred, with triethylene glycol monobutyl ether being much more preferred.

Two or more water-soluble organic solvents may be employed in combination. Preferably, glycerin and a polyalkylene glycol alkyl ether are employed in combination. Particularly preferably, glycerin and triethylene glycol monobutyl ether are employed in combination.

The total amount of the water-soluble organic solvent(s) contained in the water-based ink is preferably 5 to 40 wt. %, more preferably 10 to 30 wt. %, much more preferably 15 to 20 wt. %.

The ratio of the total amount of the cationic polymer particles and the anionic colorant particles to the total amount of the water-soluble organic solvent(s) is preferably 2/98 to 70/30, more preferably 5/95 to 50/50, much more preferably 10/90 to 30/70.

[Production of Water-Based Ink for Ink-Jet Printing]

The water-based ink for ink-jet printing of the present invention can be suitably produced through a process including the below-described step (A-1) or (A-2) and step (B), excluding the case where a water dispersion of composite particles formed of the cationic polymer particles and the anionic colorant particles adhering thereto is employed.

Step (A-1): a step of mixing the water dispersion of the cationic polymer particles with a water-soluble organic solvent, to thereby produce a dispersion containing the cationic polymer particles, water, and the water-soluble organic solvent.

Step (A-2): a step of dispersing the cationic polymer in water and a water-soluble organic solvent, to thereby produce a dispersion containing the cationic polymer particles, water, and the water-soluble organic solvent.

Step (B): a step of mixing the dispersion produced in step (A-1) or (A-2) and containing the cationic polymer particles, water, and the water-soluble organic solvent with a dispersion containing the anionic colorant particles and water.

Hereafter, step (A-1) and step (A-2) may be collectively referred to as "step (A)."

Step (A)

In step (A), a dispersion containing the cationic polymer particles, water, and a water-soluble organic solvent is produced.

Whether step (A-1) or step (A-2) is carried out depends on the form of the cationic polymer or cationic polymer particles employed in step (A).

When the cationic polymer particles are produced in the form of water dispersion through, for example, emulsion polymerization or suspension polymerization, step (A-1) is preferably carried out, whereas when the cationic polymer particles are produced in the form of polymer solution or polymer through, for example, solution polymerization or bulk polymerization, step (A-2) is preferably carried out.

In step (A-1)—in which the water dispersion of the cationic polymer particles is mixed with a water-soluble organic solvent, to thereby produce a dispersion containing the cationic polymer particles, water, and the water-soluble organic solvent—any component (e.g., water) may be added in addition to the water-soluble organic solvent.

In step (A-2)—in which the cationic polymer is dispersed in water and a water-soluble organic solvent, to thereby produce a dispersion containing the cationic polymer particles, water, and the water-soluble organic solvent—the cationic polymer employed may be dispersed in the form of solid directly in water and the water-soluble organic solvent, or may be dispersed in the form of solution prepared by dissolving the polymer in any organic solvent. When the cationic polymer is dispersed in the form of solution, the polymer may be mixed with water (and optionally a water-soluble organic solvent), and the resultant dispersion may be employed as is.

When the organic solvent exhibits volatility, a portion or the entirety of the organic solvent may be removed after dispersion, followed by further addition of water and/or the water-soluble organic solvent.

Specific examples of preferred water-soluble organic solvents employed in step (A) are as described above. Glycerin and a polyalkylene glycol alkyl ether are preferably employed. Particularly preferably, triethylene glycol monobutyl ether is employed singly, or glycerin and triethylene glycol monobutyl ether are employed in combination.

In the dispersion containing the cationic polymer particles, water, and the water-soluble organic solvent produced in step (A), the total amount of the water-soluble organic solvent is preferably 1 to 50 wt. %, more preferably 4 to 30 wt. %, much more preferably 8 to 20 wt. %.

As described above, the water-soluble organic solvent contained in the dispersion produced in step (A) preferably has a specific dielectric constant of 1 to 60, more preferably 5 to 50, much more preferably 10 to 20.

In the dispersion containing the cationic polymer particles, water, and the water-soluble organic solvent produced in step (A), the ratio by weight of the water-soluble organic solvent to water (i.e., water-soluble organic solvent/water) is preferably 1/1 to 1/20, more preferably 1/1.5 to 1/10.0, much more preferably 1/2.0 to 1/4.0, from the viewpoints of prevention of aggregation of the cationic polymer particles and the anionic colorant particles by ionic interaction, as well as improvement in filterability and optical density. When two or more water-soluble organic solvents are employed in combination, the weight ratio (water-soluble organic solvent/water) corresponds to the ratio by weight of the total amount of all the water-soluble organic solvents contained in the ink to the amount of water contained therein.

The ratio by weight of the total amount of the cationic polymer particles and the anionic colorant particles to the total amount of the water-soluble organic solvent(s) is preferably 2/98 to 70/30, more preferably 5/95 to 50/50, much more preferably 10/90 to 30/70.

The cationic polymer particle concentration of the dispersion produced in step (A) is preferably 1 to 30 wt. %, more preferably 2 to 20 wt. %, much more preferably 3 to 10 wt. %, from the viewpoint of improvement in filterability.

The dispersion preferably has a pH of 3 to 12, more preferably 6 to 10, much more preferably 8 to 9, from the viewpoint of improvement in filterability and optical density. The pH of the dispersion is measured at 25° C. by means of a pH meter (F-23 (trade name), product of Horiba, Ltd.).

Step (B)

In step (B), the dispersion produced in step (A-1) or (A-2) and containing the cationic polymer particles, water, and the water-soluble organic solvent is mixed with a dispersion containing the anionic colorant particles and water.

The cationic-polymer-particle-containing dispersion contains both water and the water-soluble organic solvent. Therefore, conceivably, when the dispersion containing the cationic polymer particles is mixed with the dispersion containing the anionic colorant particles in step (B), formation of coarse particles—which would occur due to aggregation (by ionic interaction) of the anionic colorant particles and the cationic polymer particles resulting from a local increase in concentration of these particles—is prevented, and an ink which provides a printed image with high optical density and exhibits excellent filterability is effectively produced.

From the viewpoint of improvement in optical density and filterability, preferably, the dispersion produced in step (A-1) or (A-2) and containing the cationic polymer particles, water, and the water-soluble organic solvent is added dropwise to and uniformly mixed with the dispersion containing the anionic colorant particles and water, while the anionic-colorant-particle-containing dispersion is stirred. The reason why this mixing method further improves optical density and filterability has not yet been elucidated. However, conceivably, when the cationic polymer particles whose ionic property is reduced with the water-soluble organic solvent are gradually mixed with the dispersion containing the anionic colorant particles, ionic nature-based aggregation is further suppressed, and a uniform ink is produced.

The aforementioned addition (mixing) is preferably carried out at 0 to 50° C., more preferably at 0 to 30° C.

From the viewpoint of improvement in filterability, preferably, dispersion treatment is carried out after step (B).

The anionic colorant particles employed in step (B) are preferably colorant-containing anionic polymer particles, more preferably the colorant-containing cross-linked polymer particles produced in the aforementioned step (3).

For example, the water dispersion of the colorant-containing (cross-linked) polymer particles produced in the aforementioned step (2) or (3) may be used, as is, as the dispersion containing the anionic colorant particles employed in step (B).

From the viewpoint of improvement in filterability and optical density, preferably, water-soluble organic solvents are incorporated in advance into the dispersion containing the anionic colorant particles before step (B).

A mixture of all the water-soluble organic solvents contained in the anionic-colorant-particle-containing dispersion preferably has a specific dielectric constant of 1 to 50, more preferably 2 to 40, much more preferably 5 to 30, from the viewpoint of improvement in filterability and optical density.

The water-soluble organic solvent concentration of the anionic-colorant-particle-containing dispersion is preferably 0 to 0.9 wt. %, more preferably 0.1 to 0.8 wt. %, much more preferably 0.2 to 0.7 wt. %, from the viewpoint of improvement in filterability and optical density.

The anionic colorant particle concentration of the anionic-colorant-particle-containing dispersion is preferably 1 to 40 wt. %, from the viewpoint of improvement in filterability.

The anionic-colorant-particle-containing dispersion preferably has a pH of 6 to 12, more preferably 7 to 11, much more preferably 8 to 10, from the viewpoint of dispersion stability of the particles in the ink.

[Water-Based Ink for Ink-Jet Printing]

The water-based ink for ink-jet printing of the present invention may contain an additive which is generally used in a water-based ink, such as a wetting agent, a penetrant, a dispersant, a surfactant, a viscosity modifier, a defoaming agent, a preservative, a mildew-proof agent, or an anti-corrosion agent.

The amounts of the respective components of the ink of the present invention are as follows.

The colorant content of the ink of the present invention, which colorant is contained in the anionic colorant particles employed in the ink, is preferably 1 to 25 wt. %, more preferably 2 to 20 wt. %, still more preferably 4 to 15 wt. %, much more preferably 5 to 12 wt. %, from the viewpoint of improvement in optical density of a printed image provided by the ink. The water content of the ink is preferably 20 to 90 wt. %, more preferably 30 to 80 wt. %, much more preferably 40 to 70 wt. %.

The cationic polymer particle content of the ink is preferably 0.1 to 20 wt. %, more preferably 0.5 to 15 wt. %, still more preferably 1 to 10 wt. %, much more preferably 1 to 5 wt. %, from the viewpoint of improvement in optical density of a printed image provided by the ink. The ratio by weight of the cationic polymer particles to the anionic colorant particles is preferably 1/100 to 5/1, more preferably 1/50 to 2/1, much more preferably 1/10 to 1/1.

The water-based ink of the present invention preferably has a pH of 7 to 10, more preferably 8 to 10, from the viewpoint of dispersion stability of the water-based ink.

The water-based ink of the present invention preferably has a surface tension (20° C.) of 23 to 50 mN/m, more preferably 23 to 45 mN/m, much more preferably 25 to 40 mN/m.

The water-based ink of the present invention preferably has a viscosity (20° C.) of 2 to 20 mPa·s, more preferably 2.5 to 16 mPa·s, much more preferably 2.5 to 12 mPa·s, from the viewpoint of maintenance of good ejection reliability.

No particular limitation is imposed on the ink-jet system to which the water-based ink of the present invention is applied. However, the water-based ink is preferably employed in a piezo-type ink-jet printer suitable for ejection of a dispersion containing a dispersible coloring material (e.g., pigment) or particles (e.g., polymer particles).

EXAMPLES

In the following Production Examples, Examples, and Comparative Examples, unless otherwise specified, the units "part(s)" and "%" refer to "part(s) by weight" and "% by weight," respectively. The weight-average molecular weight of each polymer, the average particle size of the polymer particles, and the specific dielectric constant of each water-soluble organic solvent were determined in the following procedures. The filterability of each water-based ink was measured. Each ink was printed according to the following printing process, and the optical density of the printed image was evaluated.

(1) Determination of Weight-Average Molecular Weight (Mw) of Anionic Polymer

Phosphoric acid and lithium bromide were dissolved in N,N-dimethylformamide so that the concentrations thereof were adjusted to 60 mmol/L and 50 mmol/L, respectively, to thereby prepare a solvent. Each polymer was dissolved in the thus-prepared solvent, and the solution was subjected to gel chromatography (TSK-GEL α-M×2 in HLC-8120GPC available from Tosoh Corporation (flow speed: 1 mL/min)). Polystyrene was used as a standard.

(2) Determination of Average Particle Sizes of Cationic Polymer Particles, Pigment-Containing Anionic Polymer Particles, Composite Particles, and Mixed Particles Average particle size was measured by means of a laser particle analyzing system "ELS-8000" (cumulant analysis) available from Otsuka Denshi Co., Ltd. The particles to be analyzed were dispersed in water so as to form a dispersion having a particle concentration of about $5\times10^{-3}$ wt. %. The measurement was performed at 25° C., an angle between the incident light and a detector of 90°, and a cumulative frequency of 100 times. The refractive index of water (1.333) was input to the analyzing system as a refractive index of the dispersing medium.

(3) Determination of Specific Dielectric Constant of Water-Soluble Organic Solvent The specific dielectric constant of a water-soluble organic solvent in which cationic polymer particles were dispersed was determined through the following procedure.

In each example, a solvent employed in the Example or water-soluble organic solvents mixed at proportions shown in Table 1 were subjected to measurement. The measurement was performed by means of a PRECISION COMPONENT ANALYZER (WAYNE KERR, available from Toyo Corporation), with a measurement jig (MODEL 12962A, control software WITT-64B Ver. 2.0). The e' value measured at 25° C. and 10,000 Hz was employed as a specific dielectric constant.

(4) Storage Stability of Water Dispersion

Each water dispersion was charged into a glass container, and the container was sealed. After storage at 30° C. for 7 days, the viscosity of the water dispersion was measured at 20° C. by means of an E-type viscometer (RE80L, Toki Sangyo Co., Ltd.), and the percent change in viscosity was determined according to the following equation. The smaller the absolute value of the percent change, the higher the storage stability.

Storage stability (percent change in viscosity) (%)= (([viscosity after storage]−[viscosity before storage]/[viscosity before storage])×100

(5) Filterability

Each ink was filtered by means of a 2.5-mL needle-less syringe (Terumo Corporation) equipped with a 5-μm filter (cellulose acetate membrane having an outer diameter of 2.5 cm, available from Sartorius Corporation). The volume of the ink until occurrence of clogging in one filter was measured, and the filterability was evaluated by the thus-measured volume. The larger the measured volume, the more excellent the filterability.

(6) Printing Method

Each ink was fed, via a silicone tube, to a black head of an ink-jet printer (piezoelectric type, Model: EM-930C, available from Seiko Epson Co., Ltd.) through an ink inlet provided above the black head. Subsequently, a solid image printing pattern (204 mm×275 mm) was provided by use of graphic image editing software (Photoshop, available from Adobe Corporation). Through varying the duty ratio of trial solid images (printing conditions: plain paper (printing paper), and black, fine, and bidirectional (printing mode)), the duty ratio was controlled such that the actual ink discharge amount was adjusted to 0.75±0.01 mg/cm². The ink discharge amount was determined from the change in weight of a screw pipe holding the ink. By use of the duty-controlled solid image, printing was performed on a commercial plain paper (XEROX 4200 (trade name), available from XEROX Corporation, quality paper grade).

(7) Measurement of Optical Density

The obtained printed products were allowed to stand at 25° C. and a humidity of 50% for 24 hours. Then, the optical density of each print surface was measured by means of a Macbeth densitometer (Model: RD914, available from Gretag-Macbeth Corporation). In the measurement procedure, a light source D65 was employed for image observation. The concentration of magenta color component was measured, when a field number of 2 and a concentration standard of DIN 16536 were employed. The points of measurement numbered 10, of which five were randomly selected from a printed portion in a forward printing direction, and the other five points were randomly selected from a printed portion in a reverse printing direction. The thus-obtained ten measurements were averaged.

Synthesis Example I-1

Synthesis of Cationic Polymer Particles (a-1)

To a separable flask (capacity: 500 mL), ion-exchanged water (300 g), styrene (45 g), and divinylbenzene (2.5 g), methacryloyloxyethyltrimethylammonium chloride (2.5 g) were added, and the mixture was heated to 70° C. under stirring at 300 rpm for 20 minutes. After completion of stirring, a polymerization initiator (2,2'-azobis(2-methylpropionamidine)dihydrochloride, V-50 (trade name), available from Wako Pure Chemical Industries, Ltd.) (0.5 g) dissolved in ion-exchanged water (5 g) was added to the mixture. The resultant mixture was allowed to react for three hours at 70° C. under stirring at 200 rpm. The reaction system was heated to 75° C. and was allowed to further react for 3 hours (soap-free emulsion polymerization).

The thus-produced emulsion was filtered through a 200-mesh stainless steel mesh, and the filtrate was concentrated by means of an evaporator until the solid content of the filtrate was adjusted to 25%. The thus-concentrated emulsion was centrifuged (6,000 rpm, 15 min), and the liquid layer was collected through decantation, followed by filtration through a filter (Mini Sarto syringe filter, available from Sartorius Corporation, pore size: 5 μm, material: cellulose acetate), to thereby remove coarse particles. The pH of the filtrate was adjusted to 7 with 1N sodium hydroxide, and the filtrate diluted with ion-exchanged water so that the solid content of the diluted filtrate was adjusted to 20%, to thereby produce a water dispersion of cationic polymer particles (a-1) having an average particle size of 119 nm.

Synthesis Example I-2

Synthesis of Cationic Polymer Particles (a-2)

The procedure of Synthesis Example I-1 was repeated, except that the monomers were changed to styrene (46.25 g), divinylbenzene (2.5 g), and methacryloyloxyethyltrimethylammonium chloride (1.25 g), to thereby produce a water dispersion of cationic polymer particles (a-2) having an average particle size of 195 nm, the dispersion having a solid content of 20%.

Preparation Example I-1

Preparation of Water Dispersion of
Pigment-Containing Anionic Polymer Particles (1) Synthesis of Anionic Polymer Benzyl acrylate (c) (142 parts), methacrylic acid (a) (38 parts), and styrene macromer (b) (AS-6S (trade name), available from Toagosei Co., Ltd.) (solid content: 50%) (40 parts) were mixed together, to thereby prepare a liquid monomer mixture.

To a reactor, methyl ethyl ketone (18 parts), a chain-transfer agent (2-mercaptoethanol) (0.03 parts), and a 10% portion of the aforementioned liquid monomer mixture were added with mixing, to thereby produce an initial feed monomer solution. The reactor was sufficiently purged with nitrogen gas.

Separately, the remaining portion (90%) of the aforementioned liquid monomer mixture, the aforementioned chain-transfer agent (0.27 parts), methyl ethyl ketone (42 parts), and an azo-type radical polymerization initiator (2,2'-azobis-(2, 4-dimethylvaleronitrile), V-65 (trade name), available from Wako Pure Chemical Industries, Ltd.) (1.2 parts) were mixed together, to thereby produce a monomer solution for dropwise addition. The solution was put into a dropping funnel and added dropwise to the initial feed monomer solution over three hours in a nitrogen atmosphere, while the initial feed monomer solution placed in the reactor was heated to 75° C. under stirring. After completion of addition and elapse of two hours at 75° C., a polymerization initiator solution prepared through dissolving the aforementioned polymerization initiator (0.3 parts) in methyl ethyl ketone (5 parts) was added thereto, and the mixture was further aged at 75° C. for 2 hours and at 80° C. for 2 hours, to thereby produce a solution of an anionic polymer in methyl ethyl ketone (weight average molecular weight of the polymer: 90,000).

(2) Preparation of Water Dispersion of Pigment-Containing Anionic Polymer Particles The solution of the anionic polymer in methyl ethyl ketone, produced in the (1) above, was dried under reduced pressure, to thereby produce an anionic polymer. This polymer (45 parts) was dissolved in methyl ethyl ketone (300 parts), and a neutralizing agent (5N aqueous sodium hydroxide) (10.2 parts), 25% aqueous ammonia (12.2 parts), ion-exchanged water (1,150 parts), and a magenta pigment (solid solution pigment formed of non-substituted quinacridone and 2,9-dichloroquinacridone, Chromophthal Jet Magenta 2BC (trade name), available from Ciba Japan K.K.) (180 parts) were added to the solution. The obtained mixture was mixed by means of disperse blades (7,000 rpm) at 20° C. for one hour and further mixed for dispersing at 20° C. for 40 minutes by means of a bead-mill-type dispersing apparatus (Ultra Apex Mill, Model: UAM-05, available from Kotobuki Industries, Co., Ltd., media beads: zirconia beads, particle size: 0.05 mm). The thus-produced dispersion was subjected to further dispersion treatment by means of the aforementioned Micro Fluidizer (M-140K) at 180 MPa for a total of five times.

From the resultant dispersion, methyl ethyl ketone and a part of water were removed at 60° C. under reduced pressure. The concentrate was centrifuged, and the liquid layer was filtered through the aforementioned filter (available from Sartorius Corporation, pore size: 5 μm), to thereby remove coarse particles, whereby a water dispersion of pigment-containing anionic polymer particles (solid content: 30.0%, average particle size: 74 nm) was produced.

Preparation Example I-2

Preparation of Water Dispersion of
Pigment-Containing Anionic Cross-Linked Polymer
Particles (Anionic Colorant Particles) (b)

To the water dispersion (40 g) of pigment-containing anionic polymer particles, produced in Preparation Example I-1, an epoxy cross-linking agent (Denacol EX321 (trade name), epoxy equivalent: 140, available from Nagase ChemteX Corporation) (0.42 g) and ion-exchanged water (0.98 g) were added, and the mixture was stirred for one hour in a hot bath at 90° C. After cooling, the mixture was filtered through the aforementioned filter (available from Sartorius Corporation, pore size: 5 μm), to thereby remove coarse particles, whereby a water dispersion of pigment-containing anionic cross-linked polymer particles (anionic colorant particles) (b) (solid content: 30.0%, average particle size: 77 nm, percent cross-linking calculated by equation (I): 56.8 mol %) was produced.

Example I-1

Production of Water-Based Ink (1) Preparation of Dispersion Containing Cationic Polymer Particles (a-1) (Step (a-1))

A water dispersion of cationic polymer particles (a-1) (solid content: 20%) (25.0 parts) was placed in a beaker and stirred at room temperature (25° C.) by means of a magnetic stirrer. Water and a water-soluble organic solvent as shown in Table 1 (In this Example, ion-exchanged water (10.0 parts) and triethylene glycol monobutyl ether (10.0 parts)) were added to the dispersion of cationic polymer particles under stirring. After completion of addition, stirring was further performed for 15 minutes, to thereby produce 45.0 parts of a dispersion containing cationic polymer particles (a-1).

(2) Mixing of Dispersion Containing Cationic Polymer Particles (a-1) and Dispersion Containing Anionic Colorant Particles (Step (b))

As a dispersion containing anionic colorant particles, a water dispersion of pigment-containing anionic cross-linked polymer particles (b) (solid content: 30%) (43.1 parts), prepared in Preparation Example I-2, was stirred by means of a magnetic stirrer, and the entire amount (45.0 parts) of the dispersion containing cationic polymer particles (a-1), prepared in (1) above, was added dropwise to the dispersion containing anionic colorant particles under stirring. After completion of dropwise addition, stirring was further performed for one hour, to thereby produce a liquid mixture of step (b).

(3) Production of Ink

The liquid mixture produced in (2) above was further stirred continuously. To the liquid mixture, water, a water-soluble organic solvent, and other additives: (2-pyrrolidone, 1,2-hexanediol, triethylene glycol monobutyl ether (Butyl Triglycol (trade name), available from Nippon Nyukazai Co., Ltd.), glycerin, Surfynol 465 (nonionic surfactant, available from Nisshin Chemical Industry Co., Ltd.), Olfine E1010 (nonionic surfactant, available from Nisshin Chemical Industry Co., Ltd.), Proxel XL2 (preservative, available from Avecia K.K.), and ion-exchanged water, as shown in Table 1, were added under stirring. The resultant mixture was subjected to unitrasonication for 10 minutes by means of an ultrasonic dispersing apparatus (300 μA, available from Nihonseiki Kaisha Ltd.), to thereby produce a water-based ink.

Each ink was evaluated. Filterability was evaluated by use of the as-produced ink. Before measurement of optical density, the ink was filtered through the aforementioned filter (available from Sartorius Corporation, pore size: 5 μm), to thereby remove coarse particles. The amounts of added components in the steps are shown in Table 1, and Table 2 shows the results of evaluation.

Examples I-2, I-3, I-5, and I-6

The procedure of Example I-1 was repeated, except that the types and amounts of the water dispersion containing cationic polymer particles, water, and the water-soluble organic solvent, employed in Example I-1 (1), were changed as shown in Table 1, to thereby prepare water-based inks. The inks were evaluated, and the results are shown in Tables 1 and 2.

Example I-4

The procedure of Example I-1 was repeated, except that the procedure of Example I-1 (2) was changed as follows. Specifically, the dispersion containing cationic polymer particles (a-1) was stirred by means of a magnetic stirrer, and the dispersion containing anionic colorant particles was added to the dispersion containing cationic polymer particles (a-1) under stirring. After completion of addition, stirring was further performed for one hour, to thereby produce a liquid mixture of step (b). The thus-produced water-based ink was evaluated, and the results are shown in Tables 1 and 2.

Comparative Example I-1

The procedure of Example I-1 was repeated, except that the following procedure was performed without performing I-1 (1) and (2). Specifically, the dispersion containing anionic colorant particles (the water dispersion of pigment-containing anionic cross-linked polymer particles prepared in Preparation Example I-2) (43.1 parts), was stirred by means of a magnetic stirrer, and water, the water-soluble organic solvent, and other additives, as shown in Table 1, were added under stirring. Subsequently, in a manner similar to that of Example I-1, the resultant mixture was subjected to unitrasonication by means of an ultrasonic dispersing apparatus, to thereby produce a water-based ink. The results of evaluation of the ink are shown in Tables 1 and 2.

Examples I-7 and I-8

The procedure of Example I-1 was repeated, except that the types and amounts of water and the water-soluble organic solvent, employed in Example I-1 (1), were changed as shown in Table 1, and that only water was added in Example I-1 (3), to thereby produce water-based inks. The results of evaluation of the inks are shown in Tables 1 and 2.

TABLE 1

| | | | Examples | | | | | | Comp. Ex. | Examples | |
|---|---|---|---|---|---|---|---|---|---|---|---|
| | | | I-1 | I-2 | I-3 | I-4 | I-5 | I-6 | I-1 | I-7 | I-8 |
| (1) Step (a-1) (parts) | Water dispersion of cationic polymer particles (a-1) | | 25.0 | 25.0 | 25.0 | 25.0 | 25.0 | — | — | 25.0 | 25.0 |
| | Water dispersion of cationic polymer particles (a-2) | | — | — | — | — | — | 25.0 | — | — | — |
| | Water | Ion-exchanged water | 10.0 | 2.5 | 10.0 | 10.0 | 10.0 | 10.0 | — | 11.0 | 11.0 |
| | Water-soluble organic solvent | 2-Pyrrolidone | — | — | — | — | — | — | — | 2.0 | 2.0 |
| | | 1,2-Hexanediol | — | — | — | — | — | — | — | 2.0 | 2.0 |
| | | TEGMBE*1 | 10.0 | 2.5 | — | 10.0 | — | 10.0 | — | 10.0 | 2.0 |
| | | Glycerin | — | — | 10.0 | — | — | — | — | 2.0 | 10.0 |
| | Other additives | Surfynol 465 | — | — | — | — | — | — | — | 0.5 | 0.5 |
| | | Olfine E1010 | — | — | — | — | — | — | — | 0.5 | 0.5 |
| | | Proxel XL2 | — | — | — | — | — | — | — | 0.3 | 0.3 |
| | Total amount of dispersion (x) | | 45.0 | 30.0 | 45.0 | 45.0 | 35.0 | 45.0 | — | 53.3 | 53.3 |
| | Properties of dispersion | Sp. dielec. const. of water-soluble organic solvent | 11 | 11 | 51 | 11 | — | 11 | — | 47 | 67 |

TABLE 1-continued

|  |  |  | Examples | | | | | | Comp. Ex. | Examples | |
|---|---|---|---|---|---|---|---|---|---|---|---|
|  |  |  | I-1 | I-2 | I-3 | I-4 | I-5 | I-6 | I-1 | I-7 | I-8 |
|  |  | (water-soluble organic solvent/water) by wt. | 1/3.0 | 1/9.0 | 1/3.0 | 1/3.0 | — | 1/3.0 | — | 1/1.9 | 1/1.9 |
|  |  | pH | 7 | 7 | 7 | 7 | 7 | 7 | — | 9 | 9 |
| (2) Step (b) | Amount of water dispersion (y) of anionic colorant particles (b) |  | 43.1 | 43.1 | 43.1 | 43.1 | 43.1 | 43.1 | 43.1 | 43.1 | 43.1 |
|  | Order of addition in step (b)*2 |  | (A) | (A) | (A) | (B) | (A) | (A) | — | (A) | (A) |
| (parts) | Total (x) + (y) |  | 88.1 | 73.1 | 88.1 | 88.1 | 78.1 | 88.1 | 43.1 | 96.4 | 96.4 |
| (3) Step of ink production (parts) | Water | Ion-exchanged water | 4.6 | 12.1 | 4.6 | 4.6 | 4.6 | 4.6 | 39.6 | 3.6 | 3.6 |
|  | Water-soluble organic solvent | 2-Pyrrolidone | 2.0 | 2.0 | 2.0 | 2.0 | 2.0 | 2.0 | 2.0 | — | — |
|  |  | 1,2-Hexanediol | 2.0 | 2.0 | 2.0 | 2.0 | 2.0 | 2.0 | 2.0 | — | — |
|  |  | TEGMBE*1 | — | 7.5 | — | — | 10.0 | — | 10.0 | — | — |
|  |  | Glycerin | 2.0 | 2.0 | 2.0 | 2.0 | 2.0 | 2.0 | 2.0 | — | — |
|  | Other additives | Surfynol 465 | 0.5 | 0.5 | 0.5 | 0.5 | 0.5 | 0.5 | 0.5 | — | — |
|  |  | Olfine E1010 | 0.5 | 0.5 | 0.5 | 0.5 | 0.5 | 0.5 | 0.5 | — | — |
|  |  | Proxel XL2 | 0.3 | 0.3 | 0.3 | 0.3 | 0.3 | 0.3 | 0.3 | — | — |
|  | Total amount of ink |  | 100 | 100 | 100 | 100 | 100 | 100 | 100 | 100 | 100 |

(1) Step (a-1): Preparation of dispersion containing cationic polymer particles.
(2) Step (b): Mixing dispersion containing cationic polymer particles and dispersion of anionic colorant particles.
*1: Triethylene glycol monobutyl ether
*2: (A): Adding dispersion containing cationic polymer particles to dispersion containing anionic colorant particles. (B): Adding dispersion containing anionic colorant particles to dispersion containing cationic polymer particles.

TABLE 2

|  |  | Examples | | | | | | Comp. Ex. | Examples | |
|---|---|---|---|---|---|---|---|---|---|---|
|  |  | I-1 | I-2 | I-3 | I-4 | I-5 | I-6 | I-1 | I-7 | I-8 |
| Ink composition (parts) | Pigment-containing anionic cross-linked polymer particles | 12.9 | 12.9 | 12.9 | 12.9 | 12.9 | 12.9 | 12.9 | 12.9 | 12.9 |
|  | Cationic polymer particles (a-1) | 5.0 | 5.0 | 5.0 | 5.0 | 5.0 | — | — | 5.0 | 5.0 |
|  | Cationic polymer particles (a-2) | — | — | — | — | — | 5.0 | — | — | — |
|  | Ion-exchanged water | 64.8 | 64.8 | 64.8 | 64.8 | 64.8 | 64.8 | 64.8 | 64.8 | 64.8 |
|  | Water-soluble organic solvent |  |  |  |  |  |  |  |  |  |
|  | 2-Pyrrolidone | 2.0 | 2.0 | 2.0 | 2.0 | 2.0 | 2.0 | 2.0 | 2.0 | 2.0 |
|  | 1,2-Hexanediol | 2.0 | 2.0 | 2.0 | 2.0 | 2.0 | 2.0 | 2.0 | 2.0 | 2.0 |
|  | TEGMBE*1 | 10.0 | 10.0 | — | 10.0 | 10.0 | 10.0 | 10.0 | 10.0 | 2.0 |
|  | Glycerin | 2.0 | 2.0 | 12.0 | 2.0 | 2.0 | 2.0 | 2.0 | 2.0 | 10.0 |
|  | Other additives | 1.3 | 1.3 | 1.3 | 1.3 | 1.3 | 1.3 | 1.3 | 1.3 | 1.3 |
|  | Total amount of ink | 100 | 100 | 100 | 100 | 100 | 100 | 100 | 100 | 100 |
| Evaluation | Optical density | 1.15 | 1.13 | 1.13 | 1.13 | 1.13 | 1.14 | 1.08 | 1.14 | 1.13 |
|  | Ink filterability (mL) | >100 | 10 | 8 | 3 | 3 | >100 | >100 | >100 | 30 |

*1: Triethylene glycol monobutyl ether

As is clear from Table 2, the water-based inks of Examples I-1 to I-8 provide higher optical densities as compared with the water-based ink of Comparative Example I-1. The water-based ink of Example I-1 provides a higher optical density as compared with the water-based inks of Example I-2 to I-6, and exhibits a more excellent filterability as compared with the water-based inks of Example I-2 to I-5.

Synthesis Example II-1

Synthesis of Water Dispersion of Cationic Polymer Particles (II-1)

Through the same procedure as employed in Synthesis Example I-1, a water dispersion of cationic polymer particles (II-1) having an average particle size of 119 nm was produced. Synthesis Example II-2 (Synthesis of Water Dispersion of Cationic Polymer Particles (II-2))

Through the same procedure as employed in Synthesis Example I-2, a water dispersion of cationic polymer particles (II-2) having an average particle size of 195 nm was produced. The water dispersion was found to have a solid content of 20%.

Comparative Synthesis Example II-1 (Synthesis of Water Dispersion of Anionic Polymer Particles (II-1)

(1) Synthesis of Anionic Polymer

Methacrylic acid (14 parts), styrene macromer (AS-6S (trade name), available from Toagosei Co., Ltd.) (solid content: 50%) (30 parts), styrene (46 parts), and polypropylene glycol monomethacrylate (25 parts) were mixed together, to thereby prepare a liquid monomer mixture.

To a reactor, methyl ethyl ketone (3 parts), a chain-transfer agent (2-mercaptoethanol) (0.03 parts), and a 10% portion of the aforementioned liquid monomer mixture were added with mixing, to thereby produce an initial feed monomer solution. The reactor was sufficiently purged with nitrogen gas.

Separately, the remaining portion (90%) of the aforementioned liquid monomer mixture, the aforementioned chain-transfer agent (0.27 parts), methyl ethyl ketone (21 parts), and an azo-type radical polymerization initiator (2,2'-azobis-(2, 4-dimethylvaleronitrile), V-65 (trade name), available from Wako Pure Chemical Industries, Ltd.) (1.0 parts) were mixed together, to thereby produce a monomer solution for dropwise addition. The solution was put into a dropping funnel and added dropwise to the initial feed monomer solution over three hours in a nitrogen atmosphere, while the initial feed monomer solution placed in the reactor was heated to 75° C. under stirring. After completion of addition and elapse of two hours at 75° C., a polymerization initiator solution prepared through dissolving the aforementioned polymerization initiator (0.9 parts) in methyl ethyl ketone (45 parts) was added thereto, and the mixture was further aged at 75° C. for 2 hours and 80° C. for 2 hours, to thereby produce a polymer solution (weight average molecular weight of the polymer: 57,000).

(2) Preparation of Water Dispersion of Anionic Polymer Particles (II-1)

The polymer solution, produced in the (1) above, was dried under reduced pressure, to thereby produce a polymer. This polymer (7.9 parts) was dissolved in methyl ethyl ketone (22.7 parts), and a neutralizing agent (5N aqueous sodium hydroxide) (2.4 parts), 25% aqueous ammonia (0.2 parts), and ion-exchanged water (66.7 parts) were added to the solution. The obtained mixture was mixed by means of disperse blades (8,000 rpm) at 15° C. for one hour and was subjected to further dispersion treatment by means of Micro Fluidizer (trade name) (high-pressure homogenizer, Model: M-140K, available from Microfluidics Inc.) at 180 MPa for a total of 19 times. From the resultant dispersion, methyl ethyl ketone and a part of water were removed at 60° C. under reduced pressure. The concentrate was centrifuged, and the liquid layer was filtered through a filter (Mini Sarto Syringe Filter, available from Sartorius Corporation, pore size: 1.2 μm, made of cellulose acetate), to thereby remove coarse particles, whereby a water dispersion of anionic polymer particles (II-1) (solid content: 19.56%, average particle size: 159 nm) was produced.

Production Example II-1

Production of Water Dispersion Containing Composite Particles (II-1)

The water dispersion (10 g) of pigment-containing anionic polymer particles, produced in Preparation Example I-1, was stirred. The water dispersion of cationic polymer particles (II-1) produced in Synthesis Example II-1 was mixed with ion-exchanged water so as to adjust the solid content thereof to 6%. The latter water dispersion (20 g) was added dropwise to the former water dispersion under stirring. Thereafter, the mixture was subjected to dispersion treatment for three minutes by means of an ultrasonic dispersing apparatus (300 μA), to thereby produce a water dispersion containing composite particles (II-1) having an average particle size of 138 nm.

Figure 2:
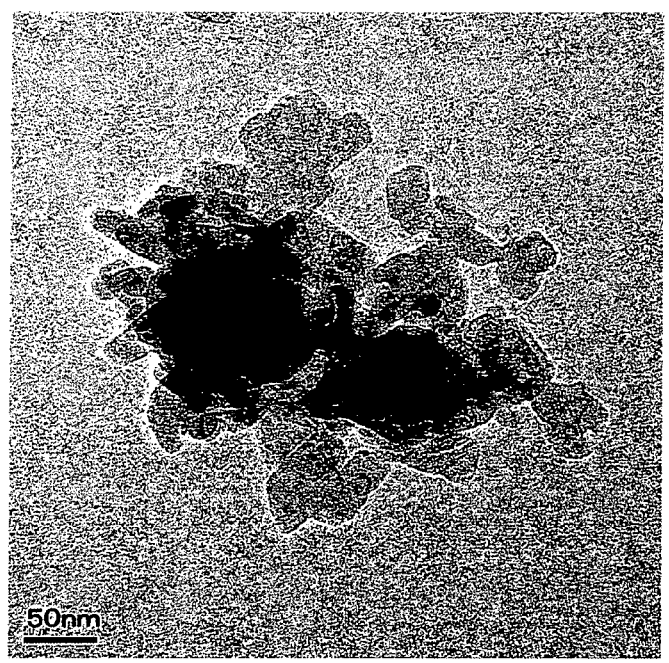
FIG. 2 shows another electron microscopic photoimage of composite particles produced in Production Example II-1.

The thus-formed composite particles II-1 were observed under a transmission electron microscope (Model: JEM-2100, available from JEOL Ltd., acceleration voltage: 80 KV), and the obtained images are shown in FIGS. 1 and 2.

Production Example II-2

Production of Water Dispersion Containing Composite Particles (II-2)

The water dispersion (40 g) of pigment-containing anionic polymer particles, produced in Preparation Example I-1, was stirred. The water dispersion of cationic polymer particles (II-1) produced in Synthesis Example II-1 was mixed with ion-exchanged water so as to adjust the solid content thereof to 13%. The latter water dispersion (18.46 g) was added dropwise to the former water dispersion under stirring. Thereafter, the mixture was subjected to dispersion treatment for five minutes by means of an ultrasonic dispersing apparatus (300 μA). Subsequently, the aforementioned epoxy cross-linking agent (Denacol EX321) (0.47 g) and ion-exchanged water (1.07 g) were added, and the mixture was stirred for one hour in a hot bath at 90° C. After cooling, the mixture was filtered through the aforementioned filter (available from Sartorius Corporation, pore size: 5 μm), to thereby remove coarse particles, whereby a water dispersion of composite particles (II-2) having an average particle size of 147 nm (percent cross-linking calculated by equation (I): 56.8 mol %) was produced.

Comparative Production Example II-1

Production of Water Dispersion Containing Mixed Particles

The water dispersion (10 g) of pigment-containing anionic polymer particles, produced in Preparation Example II-1, was stirred. The water dispersion of anionic polymer particles produced in Comparative Synthesis Example II-1 was mixed with ion-exchanged water so as to adjust the solid content thereof to 6%. The latter water dispersion (20 g) was added dropwise to the former water dispersion under stirring. Thereafter, the mixture was subjected to dispersion treatment for three minutes by means of an ultrasonic dispersing apparatus (300 μA), to thereby produce a water dispersion containing mixed particles.

Production Example II-3

Production of Water Dispersion Containing Composite Particles (II-3)

The water dispersion (10 g) of pigment-containing anionic polymer particles, produced in Preparation Example I-1, was stirred. The water dispersion of cationic polymer particles (II-2) produced in Synthesis Example II-2 was mixed with ion-exchanged water so as to adjust the solid content thereof to 6%. The latter water dispersion (20 g) was added dropwise to the former water dispersion under stirring. Thereafter, the mixture was subjected to dispersion treatment for three minutes by means of an ultrasonic dispersing apparatus (300 μA), to thereby produce a water dispersion containing composite particles (II-3) having an average particle size of 138 nm.

Formulation Example

Production of Water-Based Ink

The water dispersions each containing any of composite particles (II-1) to (II-3), produced in Production Examples II-1 to II-3; the water dispersion containing mixed particles, produced in Comparative Production Example II-1; the water dispersion of pigment-containing anionic polymer particles, produced in Preparation Example I-1; and the water dispersion of pigment-containing anionic cross-linked polymer particles, produced in Preparation Example I-2 were provided each in an amount of 10.0 parts (as reduced to pigment).

The following components: 1,2-hexanediol (available from Tokyo Kasei Kogyo Co., Ltd.) (2.0 parts), 2-pyrrolidone (available from Wako Pure Chemical Industries, Ltd.) (2.0 parts), Surfynol 465 (nonionic surfactant, available from Nisshin Chemical Industry Co., Ltd.) (0.5 parts), Olfine E1010 (nonionic surfactant, available from Nisshin Chemical Industry Co., Ltd.) (0.5 parts), glycerin (available from Kao Corporation) (2.0 parts), triethylene glycol monobutyl ether (Butyl Triglycol (trade name), available from Nippon Nyukazai Co., Ltd.) (10.0 parts), Proxel XL2 (preservative, available from Avecia K.K.) (0.3 parts), and ion-exchanged water were mixed under stirring by means of a magnetic stirrer. Stirring was further performed at room temperature for 15 minutes, to thereby produce a mixed solution. The amount of ion-exchanged water employed was adjusted so that the total amount of the mixed solution and each of the aforementioned water dispersions was adjusted to 100 parts.

Subsequently, each of the water dispersions produced in advance was added to the mixed solution under stirring by means of a magnetic stirrer, and the obtained mixture was filtered through a 1.2-μm filter (cellulose acetate membrane, available from Sartorius Corporation), to thereby produce a water-based ink.

Preparation Example III-1

Preparation of Water Dispersion of Colorant-Containing Anionic Polymer Particles Through the same procedure as employed in Preparation Example I-1, a water dispersion of colorant-containing anionic polymer particles having an average particle size of 74 nm was produced. The water dispersion was found to have a solid content of 30.0%.

Preparation Example III-2

Preparation of Water Dispersion of Colorant-Containing Anionic Cross-Linked Polymer Particles Through the same procedure as employed in Preparation Example I-2, a water dispersion of Colorant-Containing anionic cross-linked polymer particles having an average particle size of 77 nm and a percent cross-linking calculated by

TABLE 3

| | Water dispersion | Composite particles or mixed particles | Anionic pigment-containing colorant particles | Cationic polymer particles | Storage stability (%) | Optical density |
|---|---|---|---|---|---|---|
| Example II-1 | Production Example II-1 | Composite particles (II-1) | Pigment-containing anionic polymer particles | Cationic polymer particles (II-1) | +32 | 1.13 |
| Comparative Example II-1 | Comparative Production Example II-1 | Mixed particles | Pigment-containing anionic polymer particles | Cationic polymer particles (II-1) | +39 | 1.09 |
| Comparative Example II-2 | Preparation Example II-1 | — | Pigment-containing anionic polymer particles | — | +26 | 1.08 |
| Example II-2 | Production Example II-2 | Composite particles (II-2) | Pigment-containing anionic cross-linked polymer particles | Cationic polymer particles (II-1) | +5 | 1.13 |
| Comparative Example II-3 | Preparation Example II-2 | — | Pigment-containing anionic cross-linked polymer particles | — | +3 | 1.08 |
| Example II-3 | Production Example II-3 | Composite particles (II-3) | Pigment-containing anionic polymer particles | Cationic polymer particles (II-2) | +29 | 1.12 |

As is clear from Table 3, the water-based inks of Examples II-1 to II-3 provide higher optical density of the printed images, as compared with the water-based inks of Comparative Examples II-1 to II-3. Furthermore, the water-based ink of Example II-2, employing a cross-linked anionic polymer, has higher storage stability, as compared with the water-based ink of Example II-1.

equation (I) of 56.8 mol % was produced. The water dispersion was found to have a solid content of 30.0%.

Preparation Example III-3

Preparation of Water Dispersion of Colorant-Containing Cationic Polymer Particles (1) Synthesis of Cationic Polymer To a separable flask (capacity: 500 mL), benzyl methacrylate (75 g), methacryloyloxyethyltrimethylammonium chloride (25 g), methyl ethyl ketone (63 g), and ethanol (63 g) were added, and the flask was purged with nitrogen for 30 minutes. The mixture was heated to 75° C. The aforementioned polymerization initiator (V-65) (0.68 g) was dissolved in methyl ethyl ketone (10 g) and ethanol (10 g), and the solution was added dropwise to the above mixture over 90 minutes. After completion of dropwise addition, the resultant mixture was aged for 90 minutes. Subsequently, the aforementioned polymerization initiator (V-65) (0.20 g) was dissolved in MEK (5 g) and ethanol (5 g), and the solution was further added thereto. The thus-obtained mixture was further aged for three hours. After completion of aging, the mixture was cooled, and methyl ethyl ketone/ethanol solution (1/1) was added to the mixture so that the solid content was adjusted to about 30%, whereby a cationic polymer solution having a solid content 30.82% was produced.

(2) Preparation of Water Dispersion of Colorant-Containing Cationic Polymer Particles The cationic polymer solution (97.3 g) (cationic polymer content: 30.0 g), produced in (1) above, and methyl ethyl ketone (71.1 g) were placed in a 2-L container. Ion-exchanged water (461.5 g) was added to the container, and the mixture was stirred by means of disperse blades (3,000 rpm). A magenta pigment (solid solution pigment formed of non-substituted quinacridone and 2,9-dichloroquinacridone, Chromophthal Jet Magenta 2BC (trade name), available from Ciba Japan K.K., non-substituted quinacridone/2,9-dichloroquinacridone (by weight)=2/8) (120 g) was further added thereto, and stirring was further performed for one hour at a rotational speed of 8,000 rpm. The product was filtered through a 200-mesh stainless steel filter, and the filtrate was subjected to further dispersion treatment by means of the aforementioned Micro Fluidizer at 180 MPa for a total of 15 times.

From the resultant dispersion, methyl ethyl ketone and a part of water were removed at 60° C. under reduced pressure. The concentrate was centrifuged, and the liquid layer was filtered through the aforementioned filter (pore size: 5 µm), to thereby remove coarse particles, whereby a water dispersion of colorant-containing cationic polymer particles (solid content: 18.5%, average particle size: 182 nm) was produced.

Example III-1

Production of Water Dispersion Containing Composite Particles

To the water dispersion (50.0 g) of colorant-containing anionic polymer particles produced in Preparation Example III-1 under stirring, the water dispersion (17.6 g) of colorant-containing cationic polymer particles produced in Preparation Example III-3 was added dropwise. After completion of dropwise addition, ion-exchanged water (18.8 g) was added to the mixture, followed by dispersion treatment by means of an ultrasonic dispersing apparatus (300 µA) for five minutes. The thus-formed dispersion was centrifuged (4,500 rpm×21 min), and the liquid recovered through decantation was filtered through the aforementioned filter (pore size: 5 µm), to thereby remove coarse particles, whereby composite particles formed of colorant-containing cationic polymer particles to which colorant-containing anionic polymer particles are adhered was produced. This water dispersion was found to have a solid content of 20.6% and an average particle size of the particles of 186 nm.

Example III-2

Production of Water Dispersion Containing Composite Particles

To the water dispersion (50.0 g) of colorant-containing anionic polymer particles produced in Preparation Example III-1 under stirring, the water dispersion (17.6 g) of colorant-containing cationic polymer particles produced in Preparation Example III-3 was added dropwise. After completion of dropwise addition, ion-exchanged water (18.8 g) was added to the mixture, followed by dispersion treatment by means of an ultrasonic dispersing apparatus (300 µA) for five minutes. Subsequently, an epoxy cross-linking agent (Denacol EX321) (0.27 g) was added thereto, and the resultant mixture was maintained at 90° C. in a hot bath for 1.5 hours under stirring. The thus-formed dispersion was cooled and centrifuged (4,500 rpm×21 min), and the liquid recovered through decantation was filtered through the aforementioned filter (pore size: 5 µm), to thereby remove coarse particles, whereby composite particles formed of colorant-containing cationic polymer particles to which colorant-containing anionic polymer particles are adhered was produced. This water dispersion was found to have a solid content of 20.6% and an average particle size of the particles of 186 nm.

Example III-3

Production of Water-Based Ink

The water dispersion produced in Example III-1 was provided in an amount of 10.0 parts (as reduced to colorant).

The following components: 1,2-hexanediol (available from Tokyo Kasei Kogyo Co., Ltd.) (2.0 parts), 2-pyrrolidone (available from Wako Pure Chemical Industries, Ltd.) (2.0 parts), Surfynol 465 (nonionic surfactant, available from Nisshin Chemical Industry Co., Ltd.) (0.5 parts), Olfine E1010 (nonionic surfactant, available from Nisshin Chemical Industry Co., Ltd.) (0.5 parts), glycerin (available from Kao Corporation) (2.0 parts), triethylene glycol monobutyl ether (Butyl Triglycol (trade name), available from Nippon Nyukazai Co., Ltd.) (10.0 parts), Proxel XL2 (preservative, available from Avecia K.K.) (0.3 parts), and ion-exchanged water were mixed under stirring by means of a magnetic stirrer. Stirring was further performed at room temperature for 15 minutes, to thereby produce a mixed solution. The amount of ion-exchanged water employed was adjusted so that the total amount of the mixed solution and each of the aforementioned water dispersions was adjusted to 100 parts.

Subsequently, the water dispersion produced in advance in Example III-1 was added to the mixed solution under stirring by means of a magnetic stirrer, and the obtained mixture was filtered through a 1.2-µm filter (cellulose acetate membrane, available from Sartorius Corporation), to thereby produce a water-based ink. The results are shown in Table 4.

Example III-4

Production of Water-Based Ink

The procedure of Example III-3 was repeated, except that the water dispersion of colorant-containing anionic polymer particles produced in Example III-2 was used instead of the water dispersion containing composite particles produced in Example III-1, to thereby produce a water-based ink. The results are shown in Table 4.

Comparative Example III-1

Production of Water-Based Ink

The procedure of Example III-3 was repeated, except that the water dispersion of colorant-containing anionic cross-linked polymer particles produced in Preparation Example III-2 was used instead of the water dispersion containing composite particles produced in Example III-1, to thereby produce a water-based ink. The results are shown in Table 4.

Comparative Example III-2

Production of Water-Based Ink

The procedure of Example III-3 was repeated, except that the water dispersion of colorant-containing cationic polymer particles produced in Preparation Example III-3 was used instead of the water dispersion containing composite particles produced in Example III-1, to thereby produce a water-based ink. The results are shown in Table 4.

TABLE 4

| Water-based ink | Production Example | Water dispersion | | Storage stability (%) | Optical density of ink image |
| --- | --- | --- | --- | --- | --- |
| | | Anionic colorant particles | Cationic colorant particles | | |
| Example III-3 | Example III-1 | Colorant-containing anionic polymer particles | Colorant-containing cationic polymer particles | +31 | 1.11 |
| Example III-4 | Example III-2 | Colorant-containing anionic cross-linked polymer particles | Colorant-containing cationic polymer particles | +3 | 1.11 |
| Comparative Example III-1 | Preparation Example III-2 | Colorant-containing anionic cross-linked polymer particles | — | +3 | 1.08 |
| Comparative Example III-2 | Preparation Example III-3 | — | Colorant-containing cationic polymer particles | +37 | 1.07 |

As is clear from Table 4, the water-based inks of Examples III-3 and III-4 provide higher optical densities as compared with the water-based inks of Comparative Example III-1 and III-2.

INDUSTRIAL APPLICABILITY

The water dispersion and the water based ink containing the dispersion for ink-jet printing according to the present invention attains excellent optical density of printed images, filterability, and storage stability. According to the production process of the present invention, there can be effectively produced a water dispersion and a water-based ink for ink-jet printing, attaining excellent optical density of printed image, filterability, and storage stability.

The invention claimed is:

1. A process for producing a water dispersion for ink-jet printing comprising the following steps (a) and (b):
    step (a): a step of mixing a water dispersion of colorant-containing anionic polymer particles with a water dispersion of cationic polymer particles, to thereby produce a water dispersion of composite particles formed of the cationic polymer particles and the colorant-containing anionic polymer particles adhering thereto;
    step (b): a step of adding a cross-linking agent to the water dispersion of the composite particles produced in step (a), to thereby produce a water dispersion of composite particles formed of the cationic polymer particles and the colorant-containing anionic polymer particles adhering thereto, wherein the colorant-containing anionic polymer particles are cross-linked by the crosslinking agent.

* * * * *